US012632461B2

(12) United States Patent
Krishna et al.

(10) Patent No.: US 12,632,461 B2
(45) Date of Patent: *May 19, 2026

(54) APPLICATION PREDICTION BASED ON A VISUAL SEARCH DETERMINATION

(71) Applicant: Google LLC, Mountain View, CA (US)

(72) Inventors: Golden Gopal Krishna, Albany, CA (US); Shadia Walsh, San Francisco, CA (US); Rosemary Margaret La Prairie, London (GB); Carsten Hinz, Mountain View, CA (US); Simon Edward Roberts, Brighton and Hove (GB); Sarah Fay Smith, San Francisco, CA (US); Stacy Lou Chiou, Los Angeles, CA (US); Zhipeng Pan, San Mateo, CA (US); Clement Dickinson Wright, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,487

(22) Filed: Nov. 19, 2024

(65) Prior Publication Data

US 2025/0139111 A1      May 1, 2025

Related U.S. Application Data

(63) Continuation of application No. 18/486,663, filed on Oct. 13, 2023, now Pat. No. 12,182,149.

(60) Provisional application No. 63/584,539, filed on Sep. 22, 2023.

(51) Int. Cl.
G06F 16/00 (2019.01)
G06F 16/248 (2019.01)
G06F 9/451 (2018.01)

(52) U.S. Cl.
CPC ............ *G06F 16/248* (2019.01); *G06F 9/451* (2018.02)

(58) Field of Classification Search
CPC ............................... G06F 16/248; G06F 9/451
USPC ..................................................... 707/600–899
See application file for complete search history.

(56) References Cited

U.S. PATENT DOCUMENTS

| | | | |
|---|---|---|---|
| 11,379,227 | B2 | 7/2022 | Rao et al. |
| 2017/0098159 | A1 | 4/2017 | Sharifi et al. |
| 2018/0197223 | A1 | 7/2018 | Grossman |
| 2020/0151451 | A1 | 5/2020 | Lee et al. |
| 2023/0103575 | A1 | 4/2023 | Ray et al. |
| 2023/0214461 | A1 | 7/2023 | Brooks |
| 2023/0297610 | A1 | 9/2023 | Zhang |

(Continued)

*Primary Examiner* — Michelle N Owyang
(74) *Attorney, Agent, or Firm* — DORITY & MANNING, P.A.

(57) ABSTRACT

Visual search in an operating system of a computing device can process and provide additional information on the content being provided for display. The computing device can include an operating system that includes a visual search interface that obtains and processes display data associated with content currently being provided for display. The visual search interface can generate display data based on the current content provided for display, process the display data with one or more on-device machine-learned models, and provide additional information to the user. The visual search interface may transmit data associated with the display data to perform additional data processing tasks. Application suggestions may be determined and provided based on the visual search data.

20 Claims, 24 Drawing Sheets

300

(56) References Cited

U.S. PATENT DOCUMENTS

| | | | | |
|---|---|---|---|---|
| 2024/0249318 A1* | 7/2024 | Spiegel | .............. | G06Q 30/0269 |
| 2024/0256615 A1* | 8/2024 | Liu | ....................... | G06F 16/954 |
| 2024/0354332 A1* | 10/2024 | Zeng | ................... | G06V 10/751 |

* cited by examiner

200

230

SERVER COMPUTING SYSTEM(S)

GENERATIVE MODEL(S)   232

OBJECT DETECTION MODEL(S)   234

SEGMENTATION MODEL(S)   236

CLASSIFICATION MODEL(S)   238

EMBEDDING MODEL(S)   240

SEMANTIC ANALYSIS MODEL(S)   242

SEARCH ENGINE(S)   244

210

USER COMPUTING DEVICE

APPLICATIONS   212

OPERATING SYSTEM   214

VISUAL SEARCH

MODEL(S)   216

HARDWARE   218

300

800

802

OBTAIN DISPLAY DATA

804

PROCESS AT LEAST A PORTION OF THE DISPLAY DATA TO GENERATE
VISUAL SEARCH DATA

806

DETERMINE A PARTICULAR SECOND APPLICATION ON THE COMPUTING DEVICE
IS ASSOCIATED WITH THE VISUAL SEARCH DATA

808

PROVIDE AN APPLICATION SUGGESTION ASSOCIATED WITH THE PARTICULAR
SECOND APPLICATION BASED ON THE VISUAL SEARCH DATA

1000

1002
OBTAIN A PROMPT

1004
PROCESS THE PROMPT TO DETERMINE A PLURALITY OF CONTENT ITEMS
ASSOCIATED WITH THE ONE OR MORE APPLICATIONS

1006
PROCESS THE PLURALITY OF CONTENT ITEMS WITH A MACHINE-LEARNED MODEL
TO GENERATE A STRUCTURED OUTPUT

1008
PROVIDE THE STRUCTURED OUTPUT FOR DISPLAY AS A RESPONSE
TO THE PROMPT

APPLICATION PREDICTION BASED ON A VISUAL SEARCH DETERMINATION

RELATED APPLICATIONS

The present application is a continuation of U.S. application Ser. No. 18/486,663 having a filing date of Oct. 13, 2023, which claims priority to and the benefit of U.S. Provisional Patent Application No. 63/584,539, filed Sep. 22, 2023. Applicant claims priority to and the benefit of each of such applications and incorporate all such applications herein by reference in its entirety.

FIELD

The present disclosure relates generally to application prediction based on visual search results. More particularly, the present disclosure relates to a visual search interface in an operating system of a computing device that determines an application suggestion based on determined visual search data.

BACKGROUND

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

Additionally, obtaining additional information associated with information provided for display across different applications and/or media files can be difficult when the data is visual and/or niche. Therefore, a user may struggle in attempting to construct a search query to search for additional information. In some instances, a user may capture a screenshot and utilize the screenshot as a query image. However, the search may lead to irrelevant search results associated with items not of interest to the user. Additionally, screenshot capture and/or screenshot cropping can rely on several user inputs being provided that may still fail to provide desired results.

In addition, the content being requested by the user may not be readily available and/or digestible to the user based on the user not knowing where to search, based on the storage location of the content, and/or based on the content not existing. The user may be requesting search results based on an imagined concept without a clear way to express the imagined concept.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining display data. The display data can be descriptive of content currently presented for display in a first application on a user computing device. The operations can include processing at least a portion of the display data to generate visual search data. The visual search data can include one or more visual search results. The one or more visual search results can be associated with detected features in the display data. The operations can include determining a particular second application on the computing device is associated with the visual search data and providing an application suggestion associated with the particular second application based on the visual search data.

Another example aspect of the present disclosure is directed to a computer-implemented method. The method can include obtaining, by a computing system including one or more processors, display data. The display data can be descriptive of content currently presented for display on a user computing device. The method can include processing, by the computing system, at least a portion of the display data to generate visual search data. The visual search data can include one or more visual search results. The one or more visual search results can be associated with detected features in the display data. The method can include processing, by the computing system, the visual search data to determine a second application is associated with the one or more visual search results and providing, by the computing system, an application suggestion associated with the second application based on the visual search data.

Another example aspect of the present disclosure is directed to one or more non-transitory computer-readable media that collectively store instructions that, when executed by one or more computing devices, cause the one or more computing devices to perform operations. The operations can include obtaining display data. The display data can be descriptive of content presented for display on a user computing device. The operations can include processing the display data with one or more on-device machine-learned models to generate a segmented portion of the display data. The segmented portion of the display data can include data descriptive of a set of features of the content presented for display. The operations can include transmitting the segmented portion of the display data to a server computing system and receiving visual search data from the server computing system. The visual search data can include one or more search results. The one or more search results can be associated with detected features in the segmented portion of the display data. The operations can include processing the visual search data to determine a plurality of candidate second applications that are associated with the one or more search results. The operations can include obtaining a selection of a particular application suggestion to transmit at least a portion of the visual search data to a particular second application of the plurality of candidate second applications. The operations can include obtaining a model-generated content item based on the selection of the particular application suggestion. The model-generated content item may have been generated with a generative model based on the portion of the visual search data. The operations can include providing the model-generated content item to the particular second application.

Another example aspect of the present disclosure is directed to a computing device. The device can include a visual display. The visual display can display a plurality of pixels. The plurality of pixels can be configured to display content associated with one or more applications. The device can include an operating system. The operating system can include a visual search interface. The visual search interface can be at an operating system level. The visual search interface can obtain display data associated with content currently provided for display by the visual display and can process the display data with one or more on-device machine-learned models. The device can include a wireless network component. The wireless network component can include a communication interface for communicating with one or more other computing devices. The device can include one or more processors and one or more non-transitory computer-readable media that collectively store instructions that, when executed by the one or more processors, cause the computing device to perform operations.

Another example aspect of the present disclosure is directed to a mobile computing device. The device can include a visual display. The visual display can display a plurality of pixels. The plurality of pixels can be configured to display content associated with one or more applications. The device can include an operating system. The operating system can include a visual search interface at an operating system level. The visual search interface can include a display capture component. The display capture component can obtain display data associated with content currently provided for display by the visual display. The visual search interface can include an object detection model. The object detection model can process the display data to determine one or more objects are depicted. The visual search interface can include a segmentation model. The segmentation model can segment a region depicting the one or more objects to generate an image segment. The visual search interface can include a server interface. The server interface can transmit the image segment to a server computing system. The device can include a wireless network component. The wireless network component can include a communication interface for communicating with one or more other computing devices. The device can include one or more processors and one or more non-transitory computer-readable media that collectively store instructions that, when executed by the one or more processors, cause the computing device to perform operations.

Another example aspect of the present disclosure is directed to a computing system for visual search. The system can include a visual display. The visual display can display a plurality of pixels. The plurality of pixels can be configured to display content associated with one or more applications. The system can include a computing device. The computing device can be communicatively connected to the visual display. The computing device can include an operating system, a network component, one or more processors, and one or more non-transitory computer-readable media that collectively store instructions that, when executed by the one or more processors, cause the computing device to perform operations. The operating system can include a visual search application at an operating system level. The visual search application can include an overlay interface and one or more on-device machine-learned models. The overlay interface can obtain display data associated with content currently provided for display by the visual display in response to receiving a user input. The one or more on-device machine-learned models may have been trained to process image data to generate one or more machine-learned outputs based on detected features in the display data. The network component can include a communication interface for communicating with one or more other computing devices.

Another example aspect of the present disclosure is directed to a computing system. The system can include one or more processors and one or more non-transitory computer-readable media that collectively store instructions that, when executed by the one or more processors, cause the computing system to perform operations. The operations can include obtaining, at a computing device, a prompt. The prompt can be descriptive of a request for information from one or more applications on the computing device. The operations can include processing the prompt to determine a plurality of content items associated with the one or more applications. The plurality of content items can be determined by accessing data associated with the one or more applications on the computing device. The operations can include processing the plurality of content items with a machine-learned model to generate a structured output. The structured output can include information from the plurality of content items distilled in a structured data format. The operations can include providing, at the computing device, the structured output for display as a response to the prompt.

Another example aspect of the present disclosure is directed to a computer-implemented method. The method can include obtaining, by a computing system including one or more processors, a prompt. The prompt can be descriptive of a request for information from one or more applications on the computing system. The method can include processing, by the computing system, the prompt to determine a plurality of content items associated with the one or more applications. The plurality of content items can be determined by accessing data associated with the one or more applications on the computing system. The method can include processing, by the computing system, the plurality of content items with a machine-learned model to generate a structured output. The structured output can include information from the plurality of content items distilled in a structured data format. The structured output can include formatting that differs from a native format of the plurality of content items. The method can include providing, by the computing system, the structured output for display as a response to the prompt.

Another example aspect of the present disclosure is directed to one or more non-transitory computer-readable media that collectively store instructions that, when executed by one or more computing devices, cause the one or more computing devices to perform operations. The operations can include obtaining, at a computing device, a prompt. The prompt can be descriptive of a request for information from one or more applications on the computing device. The operations can include processing the prompt to determine a plurality of content items associated with the one or more applications. The plurality of content items can be determined by accessing data associated with the one or more applications on the computing device. The plurality of content items can include one or more multimodal content items. The operations can include processing the plurality of content items with a machine-learned model to generate a structured output. The structured output can include information from the plurality of content items distilled in a structured data format. The structured output can include multimodal data. The operations can include providing, at the computing device, the structured output for display as a response to the prompt.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
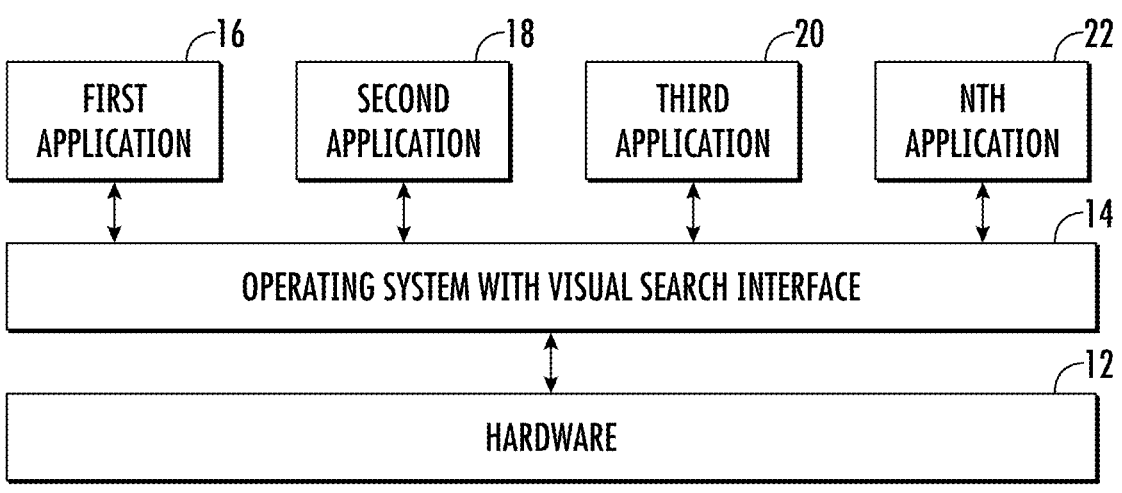
FIG. 1 depicts a block diagram of an example visual search system according to example embodiments of the present disclosure.

Reference numerals that are repeated across plural figures are intended to identify the same features in various implementations.

DETAILED DESCRIPTION

Generally, the present disclosure is directed to systems and methods for visual search at the operating system level. In particular, the systems and methods disclosed herein can leverage a visual search interface in an operating system of a computing device. The visual search interface can generate display data descriptive of content provided for display on the computing device and can process the display content to determine information associated with the displayed content. The visual search interface can include a display capture component for generating the display data, one or more on-device machine-learned models for processing the display data, and/or a transmission component for interfacing with one or more other computing systems.

Visual search in the operating system can include an interface at the operating system level that users can leverage to process visual data across applications executed by a computing device. The visual search interface can be invoked via a user input, which can include a voice command, a touch gesture, and/or one or more other user inputs. The visual search in the operating system can be included in mobile computing devices (e.g., a smartphone, a tablet, and/or a smart wearable), a smart television, a smart appliance, and/or a desktop computing device. In some implementations, a visual search interface may be implemented as an extension and/or an overlay interface for a web browser.

Obtaining additional information associated with information provided for display across different applications and/or media files can be difficult when the data is visual, niche, and/or not selectable in a current native form. Therefore, a user may struggle in attempting to construct a search query to search for additional information. In some instances, a user may capture a screenshot and utilize the screenshot as a query image. However, the search may lead to irrelevant search results associated with items not of interest to the user. Additionally, screenshot capture and/or screenshot cropping can rely on several user inputs being provided that may still fail to provide desired results.

An overlay visual search application at the operating system level can be leveraged to perform visual search across different applications, which may include social media applications, browser applications, media content viewing applications, map applications, and/or a viewfinder application. The visual search can be implemented via a kernel of an operating system installed on a computing device. The operating system can obtain and/or process data being received from one or more applications to then be transmitted to one or more server computing systems to perform one or more artificial intelligence techniques for object classification, object recognition, optical character recognition, image captioning, image-to-text summarization, text summarization, query suggestion, and/or web search based on image and/or text processing. The overlay interface can generate display data, detect objects, and provide detection indicators in a singular interface and can then transmit data for further processing based on a user selection.

Visual search in an operating system can be included in computing devices to provide a readily available interface for users to access a plurality of artificial intelligence processing systems for object classification, image captioning, image-to-text summarization, response generation, web search, and/or one or more other artificial intelligence techniques. Smart phone and smart wearable manufacturers in general may implement visual search in the operating system to leverage the utility of machine-learned models and/or search engines across different applications. The visual search in the operating system can then be utilized to determine secondary applications associated with the visual search data to provide suggestions to transmit (or share) visual search data across applications on the device.

The systems and methods disclosed herein can leverage a visual search application in the operating system to provide an overlay visual search interface that can interface with a plurality of different applications on the computing device without the computational cost and/or privacy concerns of traditional visual search techniques. For example, the visual search interface can generate display data based on content currently and/or previously provided for display and can process the display data to perform object detection, optical character recognition, segmentation, and/or other techniques on the computing device without the upload and/or download costs of interfacing with server computing systems. Additionally and/or alternatively, the display data may be generated and temporarily stored during the visual search process, then deleted to save on storage space and free up resources for future visual search instances. The data generation and processing on device can reduce the data transmitted to server computing systems and can increase privacy.

The visual search interface may include and/or utilize a plurality of on-device machine-learned models. The on-device machine-learned models can include an object detection model, an optical character recognition model, a segmentation model, a language model, a vision language model, an embedding model, an input determination model (e.g., a gesture recognition model), a speech-to-text model, an augmentation model, a suggestion model, and/or other machine-learned models. The on-device machine-learned models can be utilized for on-device processing. Additionally and/or alternatively, a portion and/or all of the display data may be transmitted to a server computing system to perform additional processing tasks, which can include search result determination with a search engine, content generation with a generative model, and/or other processing tasks.

The visual search data generated and/or determined based on on-device and/or on-server processing may provide additional information to a user that may have been previously unobtainable by the user (and/or traditionally more tedious and computationally expensive to obtain). The visual search data may be further processed to generate application suggestions to interact with and/or leverage the additional information. The application suggestions can be based on data types associated with the determined visual search results and/or based on topics, tasks, and/or entities associated with the visual search results. The application suggestions may be selectable to navigate to and/or transmit visual search data to one or more applications on the computing device. The transmission can be performed at the operating system level and may be facilitated via one or more application programming interfaces. A model-generated content item may be generated based on the visual search data and/or based on a selected application.

A user may struggle in applying the additional knowledge to other tasks, such as informing others and/or acting on the additional information (e.g., generating lists, messaging others, writing a social media post, and/or interacting with the display data). An overlay visual search application at the operating system level can be leveraged to perform visual search across different applications, and the visual search data can be transmitted to other applications on the device. The operating system can obtain and/or process data being received from one or more applications to then be processed to perform one or more artificial intelligence techniques to generate outputs that may then be processed to suggest second applications to transmit the visual search data for actionable use of the visual search data.

Additionally and/or alternatively, the visual search interface in the operating system can be configured to obtain prompt inputs from the user to aggregate data from a plurality of different applications on the computing device and/or the web. The prompt can be processed to determine one or more applications on the computing device are associated with a topic, task, and/or content type associated with the request of the prompt. An application call can then be generated and performed based on the application determination. The application call can access the one or more particular applications, search for relevant content items, and obtain content items associated with the prompt. The obtained content items may be provided for display. Alternatively and/or additionally, the content items can be processed with a generative model to generate a structured output that includes the information from the content items that are responsive to the prompt, and the information can be formatted in a digestible format, which can include a graphic, a story, an article, an image, a poem, a web page, a widget, a game, and/or other data formats.

The visual search interface may include an audio search interface, a multimodal search interface, and/or other data processing interfaces implemented at the operating system level to process data associated with a plurality of different data types. Therefore, a user may invoke an overlay interface to process image data, video data, audio data, text data, statistical data, latent encoding data, and/or multimodal data across a plurality of different applications.

The systems and methods of the present disclosure provide a number of technical effects and benefits. As one example, the systems and methods can provide visual search across a plurality of different surfaces provided by a computing device. In particular, the systems and methods disclosed herein can utilize a visual search interface in an operating system of a computing device to provide an overlay interface for data processing across a plurality of different surfaces (e.g., a plurality of different applications). The visual search interface can provide an overlay interface at the operating system level that can obtain and process data from a plurality of different applications, which may include generating and processing a screenshot of currently (and/or previously) displayed content. The visual search interface can include on-device machine-learned models that can perform object detection, optical character recognition, segmentation, query suggestion, action suggestion, and/or other data processing tasks on-device without transmitting data to a server computing system. The on-device machine-learned models can provide privacy and can provide data processing services even when network access is limited and/or unavailable. The visual search interface can be implemented in a kernel of the operating system. Additionally and/or alternatively, the visual search kernel may include an interface (e.g., an application programming interface) for communicating with a server computing system to perform one or more additional data processing tasks (e.g., search engine processing, generative model media content generation, etc.).

Another technical benefit of the systems and methods of the present disclosure is the ability to leverage a visual search system that includes one or more communication interfaces for transmitting and obtaining data to a plurality of different applications. For example, the systems and methods disclosed herein can include application programming interfaces and/or other communicative interfaces to perform data packet generation and transmittal and/or data calls. The systems and methods can process display data, generate one or more data processing outputs, and transmit data to a secondary application to perform one or more actions. Additionally and/or alternatively, data can be obtained from one or more secondary applications to generate one or more additional information content items. The operating system level system can leverage communicative interfaces to provide seamless use of data across different applications that may be utilized to transmit data packets to other users and/or generate (and/or aggregate) information for the user of the computing device. The operating system level implementation can be utilized to reduce upload and download instances and cost for a plurality of different processing tasks. Additionally and/or alternatively, temporary files and/or embeddings can be generated and processed to reduce storage usage and increase privacy budgeting.

Another example of technical effect and benefit relates to improved computational efficiency and improvements in the functioning of a computing system. For example, the systems and methods disclosed herein can leverage a visual search interface in the operating system to reduce the inputs and operations necessitated for performing particular data processing tasks across different applications. The reduction of inputs and operations can reduce the computational resources utilized to perform visual search, feature detection, and/or query and/or action suggestion based on processing display data. Additionally and/or alternatively, the operating system level visual processing system can utilize communicative interfaces to transmit and/or obtain data from secondary application(s), which can reduce the manual navigation, storage, and/or selection of a user.

With reference now to the Figures, example embodiments of the present disclosure will be discussed in further detail.

FIG. 1 depicts a block diagram of an example visual search interface in the operating system 10 according to example embodiments of the present disclosure. In particular, a visual search interface 14 can be implemented at an operating system level to provide a visual search interface 14 across applications and throughout the operating system of a computing device. FIG. 1 depicts a block diagram that illustrates that the visual search interface 14 can leverage the computational resources of the computing device hardware 12 to provide visual search and other data processing techniques across a plurality of applications, which can include a first application 16, a second application 18, a third application, and/or an nth application 22.

For example, the visual search interface 14 can include a display capture component, one or more on-device machine-learned models, and a transmission component that can leverage the hardware 12 of the computing device to perform display capture, object detection, optical character recognition, image segmentation, image augmentation, and/or data transmission. The visual search interface 14 can provide an overlay interface that can be accessed and utilized regardless of the application currently being utilized and/or displayed. The visual search interface 14 can be implemented in a kernel of the operating system.

In some implementations, the first application 16 can be a social media application, the second application 18 can be a web browser application, the third application 20 can be a media gallery application, and/or the nth application 22 can be a game application. The visual search interface 14 can be utilized to obtain and process data displayed in the social media application to identify a location, detect and search an object for a shopping task, and/or one or more other tasks. Additionally and/or alternatively, the visual search interface 14 can be utilized to process web information displayed in a viewing window of the second application 18 to generate image annotations, provide suggested searches, provide additional information, and/or suggest actions. The visual search interface 14 may be utilized to detect and search data viewed in the media gallery viewing window of the third application 20. In some implementations, the visual search interface 14 can be utilized to detect and search data associated with a game of the nth application 22 to obtain tutorials, determine progress, and/or find additional information on the game and/or features of the game.

The systems and methods disclosed herein can include a visual search interface at an operating system level. In particular, the operating system can include a kernel that utilizes a plurality of on-device machine-learned models, interfaces, and/or components to provide a visual search interface across applications and virtual environments accessed by the computing device.

Figure 2:
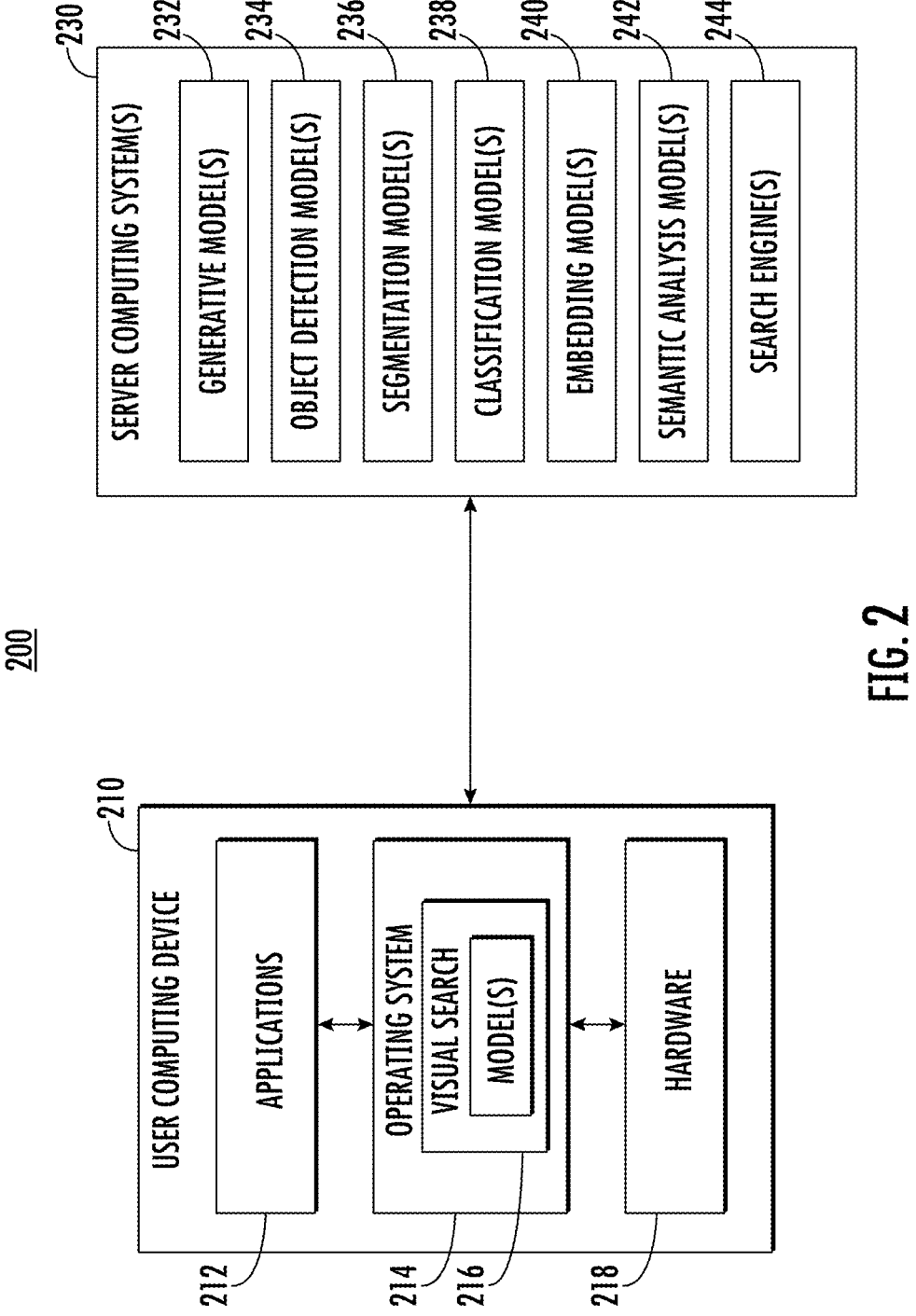
FIG. 2 depicts a block diagram of an example visual search in an operating system according to example embodiments of the present disclosure.

FIG. 2 depicts a block diagram of an example visual search interface system 200 according to example embodiments of the present disclosure. In particular, a user computing device 210 can include a visual search interface 216 in the operating system 214 that can leverage resources of the hardware 218 to provide visual search across a plurality of different applications 212. The visual search interface 216 can communicate with a server computing system 230 to obtain search results and/or perform one or more other processing tasks.

The user computing device 210 can include a visual display. The visual display can display a plurality of pixels. The plurality of pixels can be configured to display content associated with one or more applications 212. The visual display can include an organic light-emitting diode display, a liquid crystal display, an active-matrix organic light-emitting diode display, and/or another type of display. In some implementations, the user computing device 210 can include one or more additional output components. The one or more additional output components can include a haptic feedback component, one or more speakers, a secondary visual display (e.g., a projector and/or a second display on an adjacent side of the user computing device 210), and/or other output components.

The user computing device 210 can include an operating system 214 that includes a visual search interface 216. The visual search interface 216 can include a visual search interface at an operating system level. The kernel can obtain display data associated with content currently provided for display by the visual display of the user computing device 210 and can transmit the display data and/or data associated with the display data (e.g., one or more machine-learned model outputs) to a server computing system 230.

The visual search interface 216 can include one or more machine-learned models stored on the user computing device 210. The one or more machine-learned models may have been trained to detect features in image data. The one or more on-device machine-learned models may have been trained to process image data to generate one or more machine-learned outputs based on detected features in the display data. The user computing device 210 can store a plurality of on-device machine-learned models. The plurality of on-device machine-learned models may be utilized to perform object recognition, optical character recognition, input recognition, query suggestion, and/or image segmentation.

The visual search interface can include an overlay interface. The overlay interface can obtain display data associated with content currently provided for display by the visual display in response to receiving a user input. The visual search interface 216 can include a transmission component. The transmission component can transmit data descriptive of the display data and the one or more machine-learned outputs to a server computing system.

The visual search interface 216 can include a display capture component. The display capture component can obtain the display data associated with the content currently provided for display by the visual display. The display capture component may generate a screenshot that can then be processed by one or more machine-learned models.

Alternatively and/or additionally, a data packet can be generated based on the content being provided for display.

Additionally and/or alternatively, the visual search interface 216 can include an object detection model. The object detection model can process the display data to determine one or more objects are depicted. The object detection model can be trained to identify features descriptive of one or more objects associated with one or more object classes. In some implementations, the object detection model may process a screenshot (and/or script descriptive of the displayed content) to generate one or more bounding boxes associated with the location of one or more detected objects in the screenshot.

The visual search interface 216 can include an optical character recognition model. The optical character recognition model can process the display data to determine features descriptive of text and can classify (e.g., transcribe) the text. The optical character recognition can generate text data based on image data. The optical character recognition model may detect script in the display data. The script may be transcribed and/or translated. Different machine-learned models may be utilized for different content types, different languages, different locations, and/or other different context types.

In some implementations, the visual search interface 216 can include a segmentation model. The segmentation model can segment a region depicting the one or more objects to generate an image segment. The segmentation model may have been trained to generate segmentation masks that are descriptive of a silhouette of a depicted object. The segmentation model can determine the outline pixels for the detected objects, which can then be utilized to generate one or more indicators for the location and outline of the detected object. In some implementations, the segmentation model may be trained to parse through detected text to isolate the text from the display data. The segmentation model may segment text from other text in the display data based on semantics and/or entity determination. The segmentation masks may be utilized to provide snap-to indicators and/or segmentation, which may aid in input determination.

In some implementations, the visual search interface 216 can include one or more classification models. The one or more classification models can process the display data to generate one or more classifications. The one or more classifications can include image classification, object classifications, scene classifications, and/or one or more other classifications.

Additionally and/or alternatively, the visual search interface 216 can include a machine-learned region-of-interest model. The machine-learned region of interest model may have been trained to predict a region of an image that a user is requesting to be searched. The machine-learned region of interest model may have been trained to determine a saliency of an object depicted in an image based on size, location, and/or other features in the image. In some implementations, the machine-learned region of interest model may have been trained to update one or more predictions based on processing one or more user inputs. One or more user interface elements may be provided based on objects, text, and/or regions determined to be of interest.

The visual search interface 216 can include a suggestion model. The suggestion model can process the display data to determine one or more query suggestions. Alternatively and/or additionally, the machine-learned suggestion model can process an output of at least one of the object detection model or the segmentation model to generate the one or more query suggestions. The one or more query suggestions can include a query to transmit to the server computing system 230. The query can include a multimodal query that includes a portion of the display data and a text segment. The display data can be processed with one or more on-device machine-learned models to generate the text segment. The suggestion model may process the display data to determine one or more action suggestions. The one or more action suggestions can be provided as selectable graphical user interface elements. In some implementations, the one or more action suggestions can be selectable to navigate to a second application and perform one or more model-determined actions within the second application. The second application can differ from a first application that is associated with the display data. The query suggestions and/or the action suggestions can be determined based on one or more detected objects and/or based on one or more entity classifications. The suggestions may be based on determining the display data and/or the visual search data is associated with a particular topic, a particular entity, and/or a particular task. Entities can be associated with individuals, groups, companies, countries, and/or products.

Additionally and/or alternatively, the visual search interface 216 can include a server interface. The server interface can transmit data associated with the display data to a server computing system. The server interface can transmit the query to a server computing system to perform a search based on the query.

The user computing device 210 can include a wireless network component. The wireless network component can include a communication interface for communicating with one or more other computing devices. The user computing device 210 can include one or more processors and one or more non-transitory computer-readable media that collectively store instructions that, when executed by the one or more processors, cause the computing device to perform operations.

FIG. 2 can depict an example visual search interface system 200 that includes a user computing device 210 that communicates with one or more server computing systems 230 to perform one or more processing tasks across a plurality of different applications 212. The user computing device 210 can include hardware 218, an operating system 214, and a plurality of applications 212.

The hardware 218 can include physical parts of the user computing device 210, which can include a central processing unit, a graphics processing unit, random access memory, speakers, a sound card, computer data storage, input components, physical display components (e.g., a visual display), and/or other hardware components.

The operating system 214 can include software for managing the computer resources of the hardware 218 and can be utilized to manage and operate a plurality of applications 212 and/or other computer software run on the user computing device 210. The operating system 214 can include a visual search interface 216 that can be utilized as an overlay visual search interface at the operating system level. The visual search interface 216 can include a plurality of machine-learned models, heuristics, and/or deterministic functions for providing data processing services across a plurality of different applications 212. The data processing services can include, image classification, object detection, object classification, image segmentation, data augmentation, data annotation, visual search, optical character recognition, input recognition, query prediction, action prediction, and/or other data processing tasks.

The visual search interface 216 can obtain display data associated with content currently provided for display, process the display data to generate one or more processing outputs, generating one or more graphical user interface elements that provide additional information to the user, transmit the one or more processing outputs and/or the display data to a server computing system 230, receive data from the server computing system 230, and provide the data for display. The visual search interface 216 can include a display capture component that can generate a screenshot, parse through displayed data, and/or generate a data packet descriptive of the displayed content. The display data can be processed with one or more machine-learned models to perform object detection and/or optical character recognition. Masks can be generated for each detected object, which can be utilized to indicate to the user objects identified in the displayed content. Additionally and/or alternatively, the text and/or the objects identified can be processed to determine entities associated with the content, which can then be annotated in the display interface. The display data, detected object, and/or detected text can be processed to provide one or more suggestions (e.g., one or more query suggestions and/or one or more action suggestions).

The visual search interface 216 can include, provide, and/or generate plurality of different user interface elements that can provide additional information, options, and/or indicators to a user. The user interface elements can include indicators of detected objects and/or text that can be selected to perform one or more additional actions, which may include transmitting the selected data for processing with a search engine and/or a generative model. Additionally, user interface elements may provide users with the option of gesture selection. In some implementations, selectable suggestions can be provided that can be selected to perform a search (e.g., a search with a suggested query) and/or one or more other actions (e.g., send an email, open map application, color correction, auto focus, and/or data augmentation).

The visual search interface 216 can obtain data from a plurality of different applications 212 and can transmit data from a plurality of different applications to provide an overlay interface for determining and providing additional information to the user along with providing compiled and transmittable data.

The visual search interface 216 can include an input understanding model. The input understanding model can be trained to determine the relevancy and/or saliency of a plurality of different features in display data. The relevancy and/or saliency can be determined based on object and/or character size, location, and/or cohesiveness with other objects and/or characters in the display data. Additionally and/or alternatively, the input understanding model may be trained and/or conditioned on previous user interactions. For example, the input understanding model may be conditioned on previously viewed data to adjust saliency and/or relevancy based on recently viewed content. Additionally and/or alternatively, the input understanding model may be trained on previous inputs and/or gestures to understand deviances from ground truth when receiving inputs from the user. The training can configure the model to understand which element is being selected and/or when a gesture is received. The input determination model may be personalized for a particular user based on previous user interactions. Alternatively and/or additionally, the input determination model may be uniform for a plurality of users. The input determination model can be trained to determine whether a gesture is associated with invocation of the visual search interface or an interaction with a displayed application.

Additionally and/or alternatively, the input determination model may be trained to determine when an input is a gesture to select a particular object for search and/or when another input is received. In some implementations, the input understanding model may generate a polygon associated with a user input and determine an overlap between the polygon and the detected objects. The object(s) overlapped by the polygon may be determined to be selected. The input understanding model may leverage heuristics, deterministic functions, and/or learned weights.

The visual search interface 216 can communicate over a network with a server computing system 230 to provide a plurality of additional processing services. The server computing system 230 can include one or more generative models 232, one or more object detection models 234, one or more segmentation models 236, one or more classification models 238, one or more embedding models 240, one or more semantic analysis models 242, and/or one or more search engines 244.

The one or more generative models 232 can be utilized to process the display data and/or one or more processing outputs to generate a natural language output (e.g., a natural language output that includes additional information on the display data and/or entities associated with data depicted in the displayed content), a generative image, and/or other model-generated media content items. For example, one or more web resources can be accessed and processed to generate a summary for a particular topic. The one or more object detection models 234 can be utilized to perform object detection in the display data. The one or more segmentation models 236 can be utilized to segment objects and/or text segments from the displayed content. The one or more classification models 238 can be utilized to perform object classification, image classification, entity classification, format classification, sentiment classification, and/or other classification tasks. The one or more embedding models 240 can be utilized to embed portions of and/or all of the display data. The embeddings can then be utilized for searching for similar objects and/or text, classification, grouping, and/or compression. The semantic analysis model 242 can be utilized to process the display data to generate a semantic output descriptive of an understanding of the display data with regards to topic understanding, scene understanding, a focal point, pattern recognition, application understanding, and/or one or more other semantic outputs.

The one or more search engines 244 can process the display data, portions of the display data, and/or one or more machine-learned model outputs to determine one or more search results. The one or more search results can include web pages, images, text, video, and/or other data. The search results may be determined based on feature mapping, feature matching, embedding search, metadata search, label search, clustering, and/or other search techniques. The search results may be determined based on a query intent classification, a search result classification, and/or an entity classification. The outputs of the models and/or the search results can be transmitted back to the user computing device to be provided to the user via one or more user interface elements generated and provided by the visual search interface 216.

Figure 3:
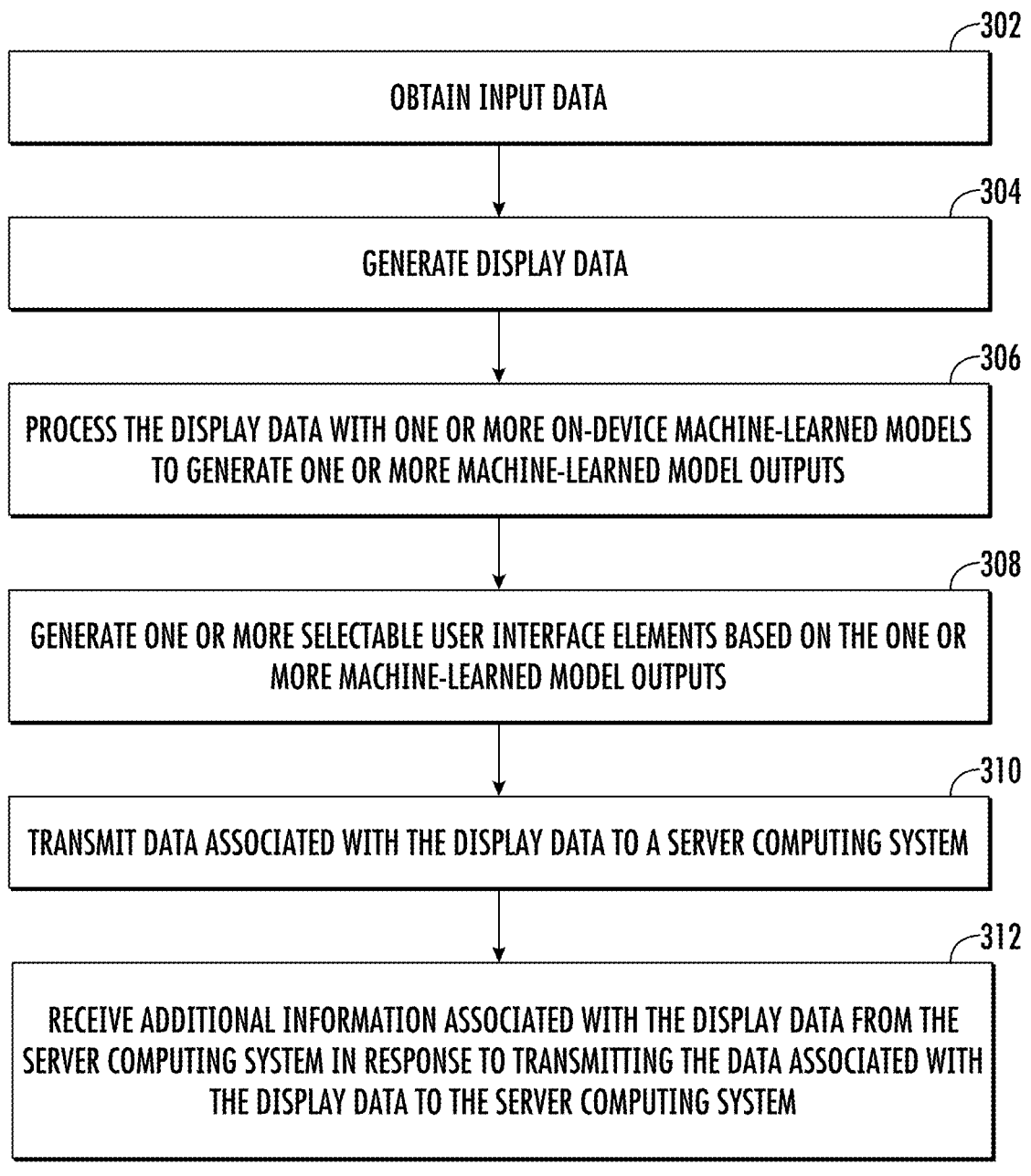
FIG. 3 depicts a flow chart diagram of an example method to perform display data processing according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain input data. The input data can be descriptive of a request to open an overlay visual search interface. The input data can be descriptive of a user selection and/or a user gesture. For example, a user may provide a diagonal pull gesture. The overlay visual search interface can be opened across a plurality of surfaces of the computing device, which can include a plurality of different applications. The overlay visual search interface can be provided regardless of the application and/or data being provided for display.

At 304, the computing system can generate display data. The display data can be descriptive of the content currently being provided for display by the user computing device. In some implementations, generating the display data can include generating a screenshot. The display data can be descriptive of a screenshot and/or a data packet associated with content rendered for display.

At 306, the computing system can process the display data with one or more on-device machine-learned models to generate one or more machine-learned model outputs. The one or more on-device machine-learned models can include an object detection model, an optical character recognition model, a segmentation model, a region-of-interest model, a suggestion model, and/or one or more classification models. The one or more machine-learned model outputs can include one or more bounding boxes, one or more text strings, one or more segmentation masks, one or more region-of-interest values and/or annotations, one or more suggestions (e.g., one or more query suggestions and/or one or more action suggestions), and/or one or more classifications (e.g., one or more object classifications, one or more image classifications, one or more entity classifications, and/or one or more other classifications).

In some implementations, the display data can be processed with an object detection model to generate a plurality of bounding boxes associated with a plurality of detected objects. The display data and/or the plurality of bounding boxes can then be processed with a segmentation model to generate a plurality of segmentation masks associated with the silhouettes for the plurality of detected objects. The plurality of segmentation masks can be utilized to generate user interface indicators that indicate what objects are detected along with outlines for the detected objects. In some implementations, the display data can be processed with one or more classification models to generate one or more object classifications for objects depicted in the displayed content. Additionally and/or alternatively, the display data can be processed with an optical character recognition model to generate text data descriptive of text in the displayed content. The display data and/or the text data may be processed to determine one or more entities associated with the text and/or the objects in the displayed content. One or more user interface elements can be generated and provided to provide an indication of the determined entities to the user.

In some implementations, the display data, segmented image data, the bounding boxes, the text data, the classification data, and/or metadata can be processed with a suggestion model to generate one or more suggestions. The one or more suggestions can include one or more query suggestions and/or one or more action suggestions. The one or more query suggestions can be descriptive of a query suggested based on detected features in the display data and may include a multimodal query including at least a portion of the display data and a generated text string. The one or more action suggestions can be associated with suggested processing tasks, which can include transmitting data to another application, platform, and/or computing system.

At 308, the computing system can generate one or more selectable user interface elements based on the one or more machine-learned model outputs. The selectable user interface elements can include a detected object annotation, a preliminary classification, a suggested query, and/or a suggested action.

At 310, the computing system can transmit data associated with the display data to a server computing system. The data associated with the display data can include at least a portion of the display data, a segmented portion of the displayed content, a display data embedding, one or more bounding boxes, a multimodal query including at least a portion of the display data and a generated text query, and/or the one or more machine-learned model outputs. The server computing system may include one or more search engines, one or more generative models (e.g., a large language model, an image-to-text model, a text-to-image model, a vision language model, and/or other generative models), one or more classification models, and/or one or more augmentation models. The server computing system may process the data associated with the display data to determine one or more search results, generate one or more model-generated media content items, and/or one or more server outputs.

In some implementations, the data associated with the display data can be associated with a user input that selects a particular selectable user interface element. For example, a portion of the display data can be segmented and transmitted to the server computing system based on a user input. Alternatively and/or additionally, a user input may select a query suggestion, and the query associated with the suggestion can be transmitted to the server computing system.

At 312, the computing system can receive additional information associated with the display data from the server computing system in response to transmitting the data associated with the display data to the server computing system. The additional information can include one or more search results, one or more model-generated outputs, an augmented-reality rendering, updated suggestions, object annotations, and/or other information. The additional information can then be provided to the user for display. In some implementations, the additional information may be provided for display with at least a portion of the displayed content.

Figure 4A:
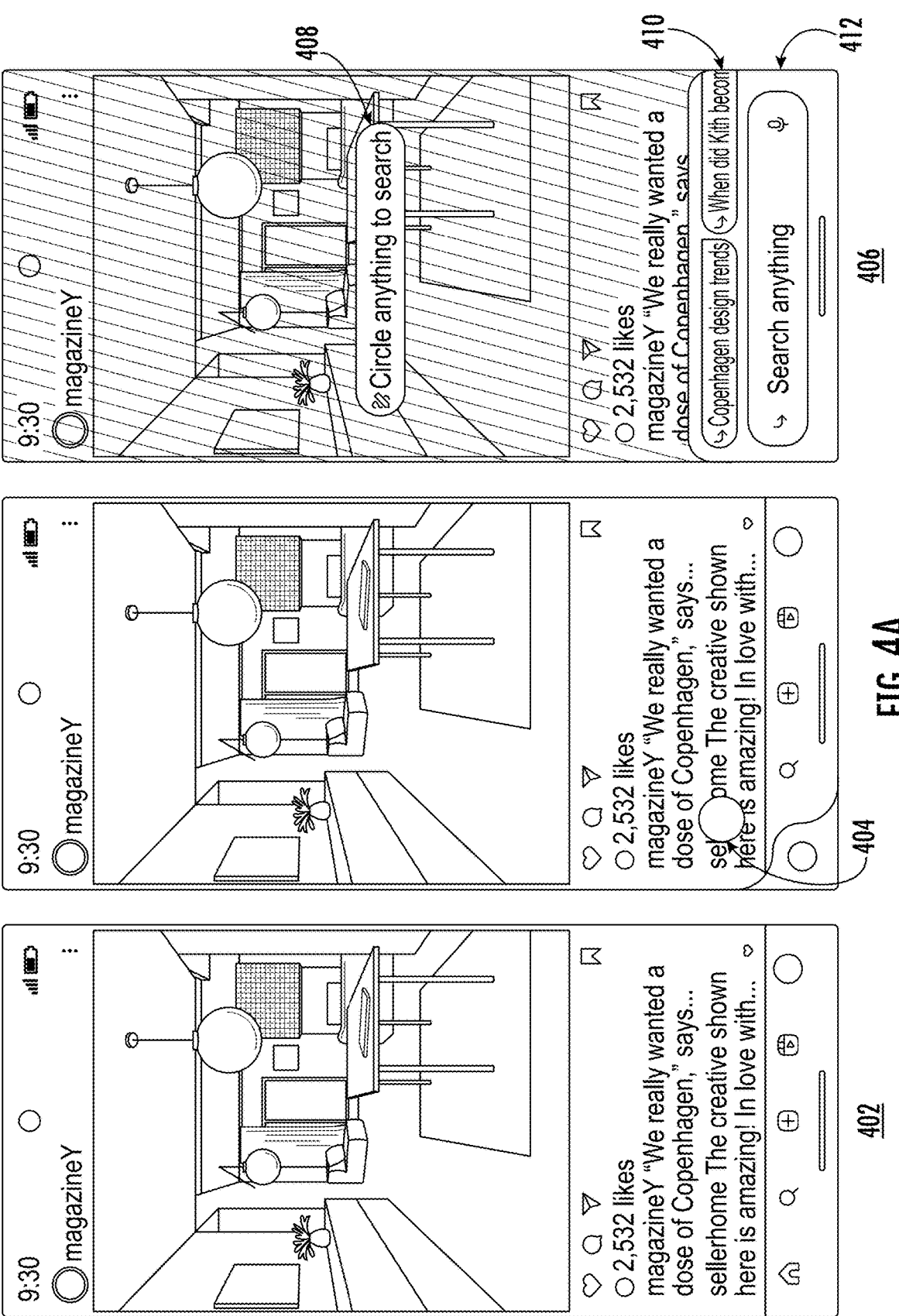
FIGS. 4A-4D depict illustrations of an example visual search interface according to example embodiments of the present disclosure.

FIGS. 4A-4D depict illustrations of an example visual search interface according to example embodiments of the present disclosure. In particular, FIG. 4A depicts an illustration of the visual search interface being opened and utilized to perform display data processing and annotation.

For example, a user may be viewing a content item in a first application 402 that may include a first application interface. The first application 402 may include a social media application that displays one or more content items. The content item may be a social media post posted by a user and/or entity that the user follows on the particular social media platform.

The computing device may provide the content item in a first application 402 and may receive an input 404 to open the visual search interface. The input 404 may include a gesture input (e.g., a swipe from the corner to a middle of the interface). The visual search interface may be an overlay interface implemented at the operating system level of the computing device.

Display data descriptive of the content item in a first application 402 can be generated and processed based on the visual search interface being opened. An input screen 406 can then be provided for display to indicate to the user that the visual search interface is being provided. The input screen 406 can include a filter (e.g., a pixy dust filter) over the display data, input instructions 408 for how to provide an input, query suggestions 410 based on the preliminary processing of the display data, and/or a query input box 412.

The filter can include tinting of the displayed content. The input instructions 408 may include text, an icon, and/or an animation that instructs a user how to select portions of the display content for search. For example, a user interface element can indicate that a circling gesture can be utilized to select objects and/or display regions. The query suggestions 410 can include query suggestions determined based on processing an entirety of the display data (e.g., an entire screenshot of the displayed content). Alternatively and/or additionally, the query suggestions 410 may be determined based on on-device object detection, on-device object segmentation, on-device optical character recognition, on-device classification, context data processing, and/or other processing techniques. The query suggestions 410 may be provided on a scrollable carousel and may be selectable to perform the search. In some implementations, a language model may be utilized to generate natural language query suggestions. The query input box 412 can be configured to receive text inputs, image inputs, audio inputs, video inputs, and/or other inputs to then be processed to perform a search locally and/or on the web.

Figure 4B:
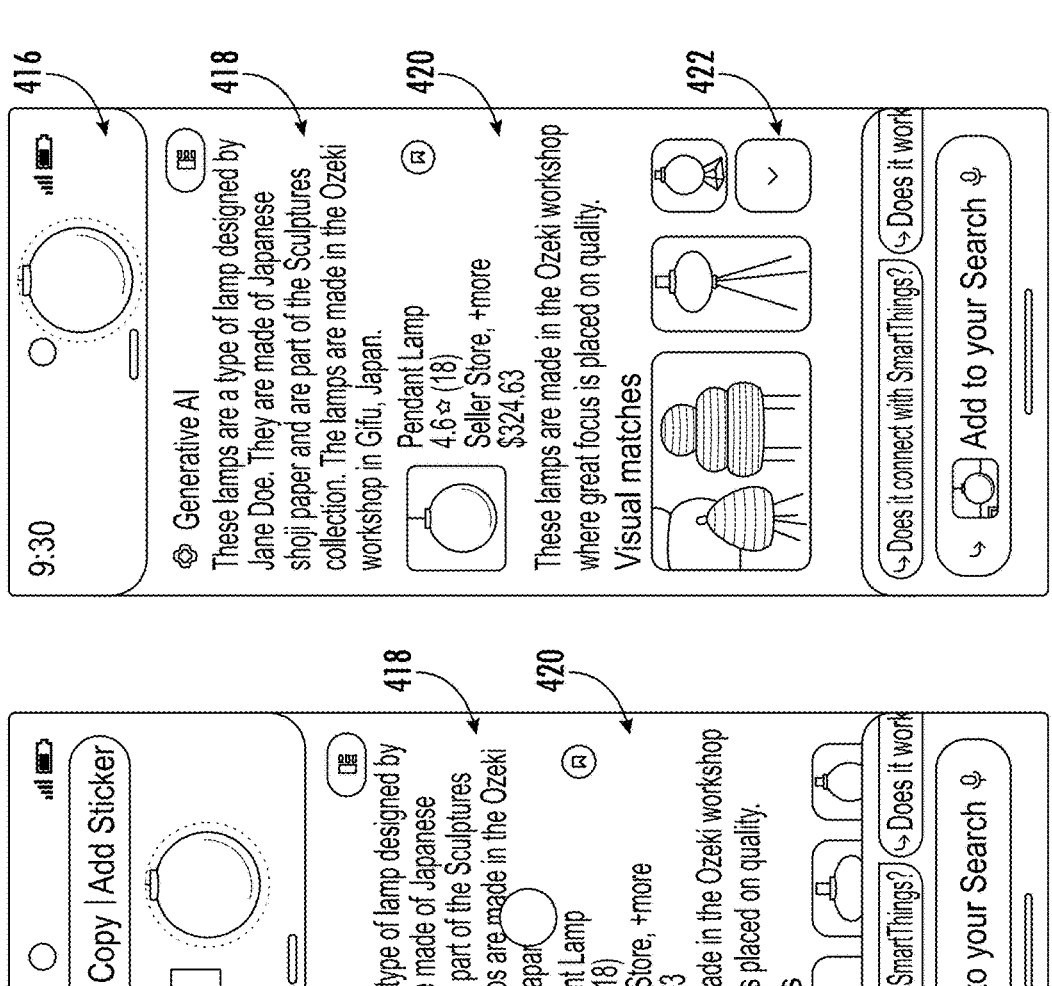
Figure 4B:
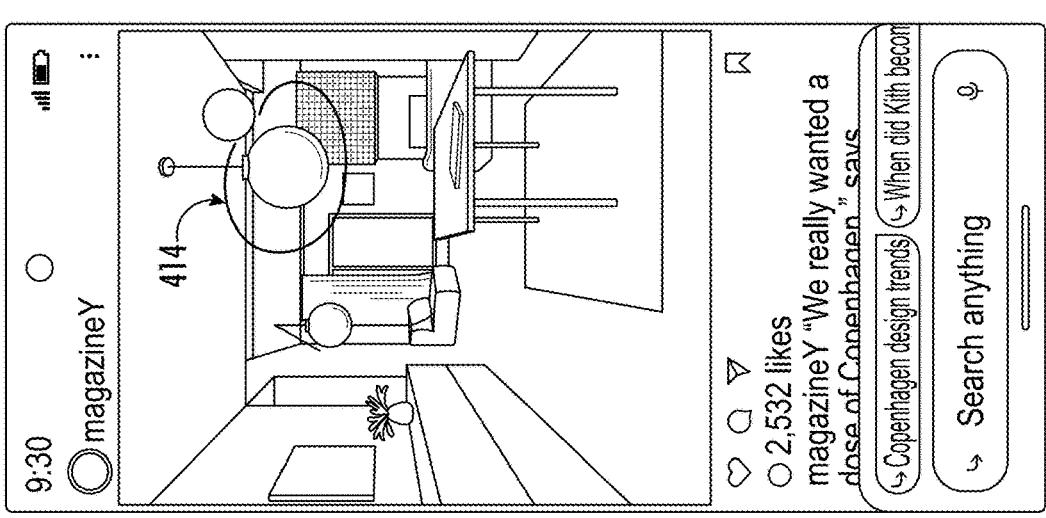

FIG. 4B depicts an illustration of object selection and processing within the visual search interface. For example, a circling gesture 414 can be received that selects a particular object depicted in the displayed content. The visual search interface may process a region associated with the gesture to determine an object and/or a set of objects selected by the circling gesture 414. The visual search interface can process the region with one or more on-device machine-learned models (e.g., an object detection model and a segmentation model) to identify an outline of the object. A graphical indicator 416 of the object and its respective outlines can be provided for display.

Pixels descriptive of the object may be segmented and searched. In some implementations, the image segment can be processed with a generative model (e.g., a vision language model and/or a large language model) to generate a model-generated response 418 to the query. The model-generated response 418 can include a natural language response that summarizes one or more web resources determined to be associated with the segmented object. Additionally and/or alternatively, the segmented image can be processed to determine one or more visual search results 420. The one or more visual search results 420 may be determined based on classification label matching, embedding search, feature matching, clustering, and/or image matching. The one or more visual search results 420 may include product listings, articles, and/or other web resources. The one or more visual search results 420 may be provided with visual matches 422 that include images that depict objects that match the segmented object. The search results interface can include search results of a plurality of different types and may be displayed in a plurality of different formats in a plurality of different panels.

In some implementations, follow-up query suggestions may be determined and provided for display in a suggestion panel adjacent to the query input box 412.

Figure 4C:
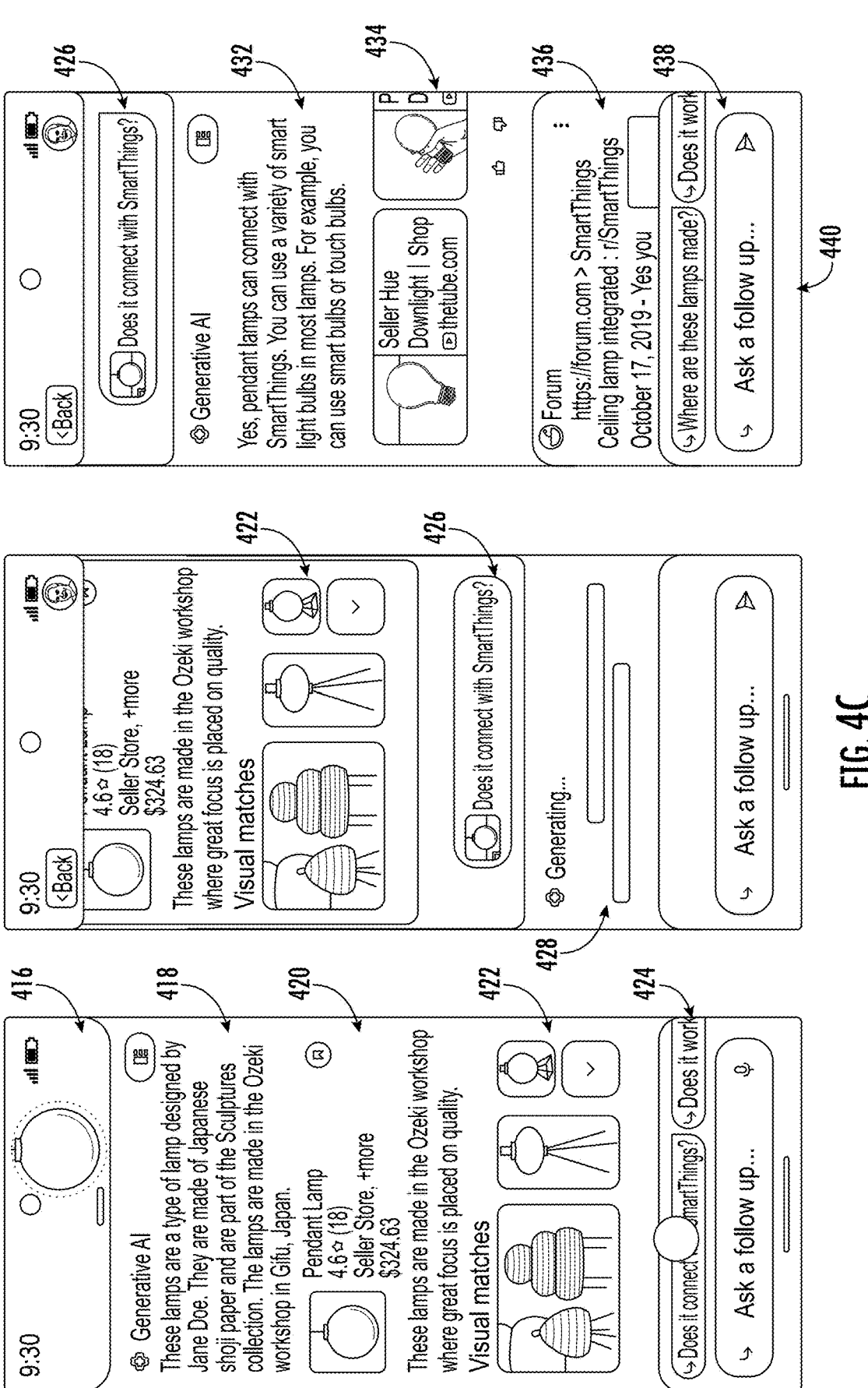
Figure 4D:
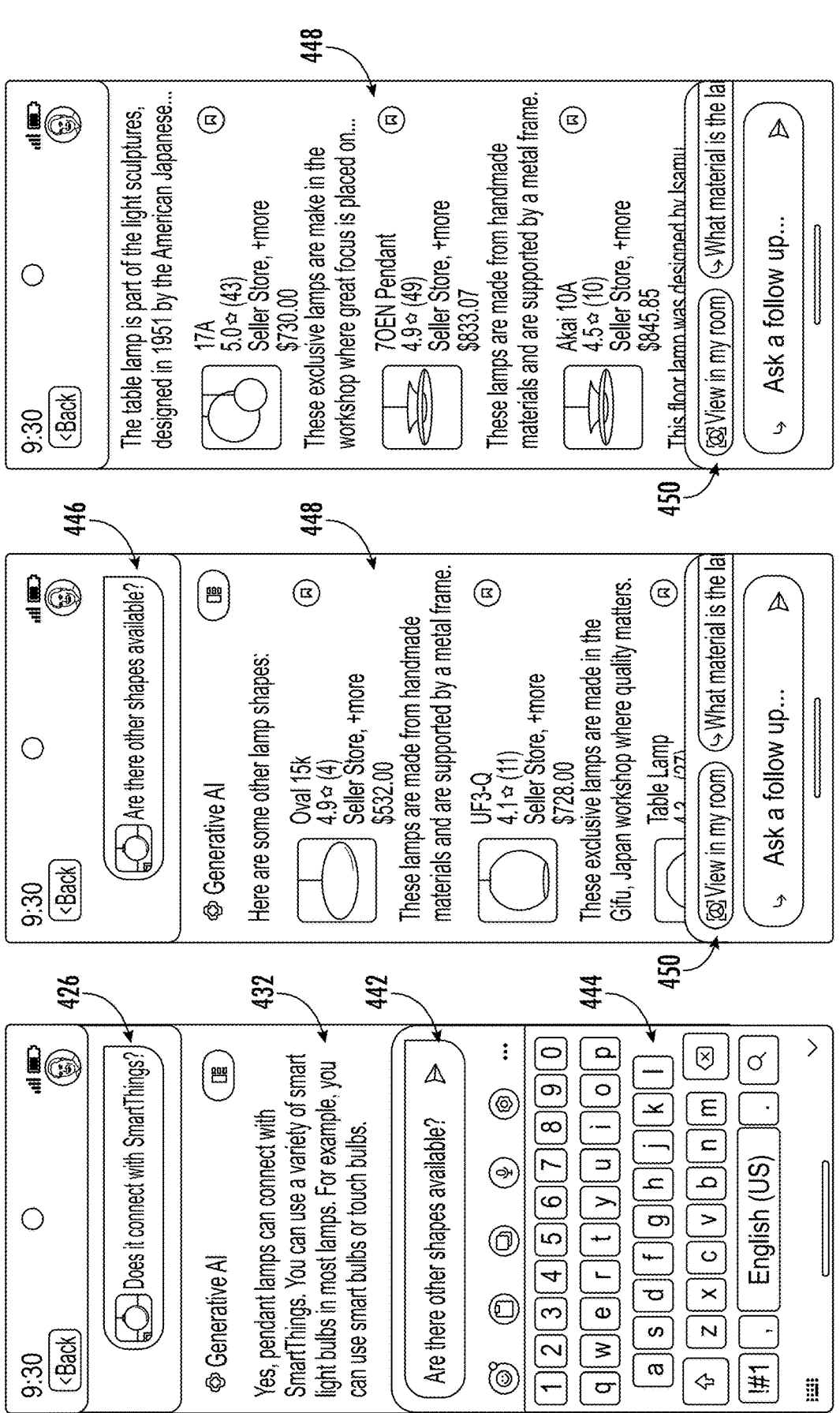

FIG. 4C depicts an illustration of an example follow-up search in the visual search interface. For example, a follow-up query suggestion 424 can be selected and processed. The processed follow-up query 426 can be provided for display as the follow-up visual search results are determined 428 and provided for display. The follow-up visual search results can include a model-generated response 432 to the processed follow-up query 426. The model-generated response 432 can include a natural language response generated with a generative model (e.g., a large language model). The model-generated response 432 may be generated based on and/or provided with one or more follow-up visual search results 434 that are responsive to the processed follow-up query 426. In some implementations, additional follow-up search results 436 can be determined and provided for display.

The query suggestions 438 can be once again updated to reflect further follow-up predictions. The query suggestions 438 can be provided with a follow-up input box 440.

FIG. 4C depicts an illustration of text input retrieval and processing with the visual search interface. For example, a graphical keyboard interface 444 can be utilized to receive a follow-up text input 442 (e.g., "Are there other shapes available?"). The input can be obtained and provided as an updated query 446, which can include the text of the input and a thumbnail depicting the image segment. The updated query 446 can be processed to determine a plurality of updated search results 448. The plurality of updated search results 448 may be formatted by processing the web resource search results with a generative model to include natural language sentences, uniform structure and style, and/or model-determined user interface elements.

In some implementations, the visual search interface may include an action suggestion and one or more query suggestions in a suggestion panel. The action suggestion can be determined and provided based on the plurality of updated search results 448. The action suggestion can include utilizing an augmented-reality experience to view one or more products in a user environment. The one or more products can be associated with a search result. The action suggestion may include interfacing with and/or navigating to another application on the computing device.

Figure 5A:
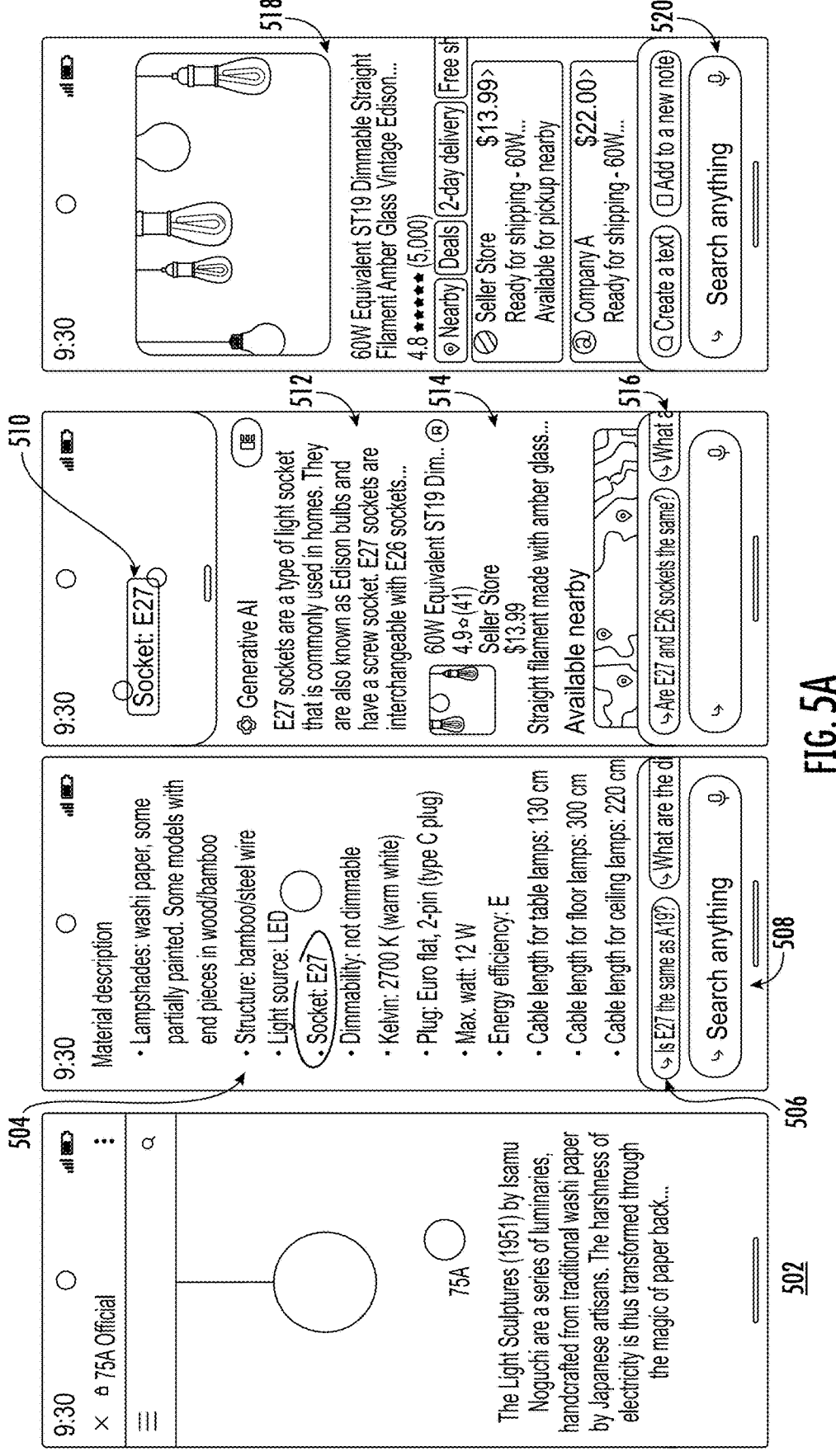
FIGS. 5A-5D depict illustrations of an example data transmittal interface according to example embodiments of the present disclosure.

FIGS. 5A-5D depict illustrations of an example data transmittal interface according to example embodiments of the present disclosure. FIG. 5A depicts an illustration of display data generation and processing with the overlay visual search interface.

For example, a user may be viewing a web page 502 in a browser application. The user may provide an input to utilize the visual search interface. A gesture input 504 can then be obtained by the visual search interface, which can select a portion of the text in the web page 502. The input screen can be provided with a plurality of preliminary query suggestions 506 that can be determined by performing optical character recognition on the web page, parsing the text, and predicting candidate queries a user may request. Additionally and/or alternatively, the input screen can include a query input box 508 for receiving text and/or other inputs from the user to be processed with the display data.

The selected text 510 can be indicated via one or more user interface elements (e.g., highlighting, selective filters, etc.). The selected text 510 can be processed to determine one or more search results 514. The selected text 510 and/or the one or more search results 514 can be processed with a generative model to generate model-generated response 512 to the query. The model-generated response 512 may be a summarization of at least a portion of the one or more search results 514. The search results interface may include a plurality of different search result types (e.g., model-generated responses, web search results, map search results, etc.).

The search results interface may be provided with a plurality of updated query suggestions 516.

A search result may be selected to view a web page 518 associated with the search result. The web page 518 may be provided for display with a plurality of application suggestions 520. The plurality of application suggestions 520 may be determined based on processing the web page 518, the selected text 510, and/or the contents of the search results interface to determine predicted actions associated with the processed data. For example, a topic, entity, and/or task may be determined to be associated with the processed data. One or more actions can be determined to be associated with the topic, entity, and/or task. Applications associated with the actions can be determined to be on the device. The plurality of application suggestions 520 can then be determined and provided with an application icon and an action suggestion.

Figure 5B:
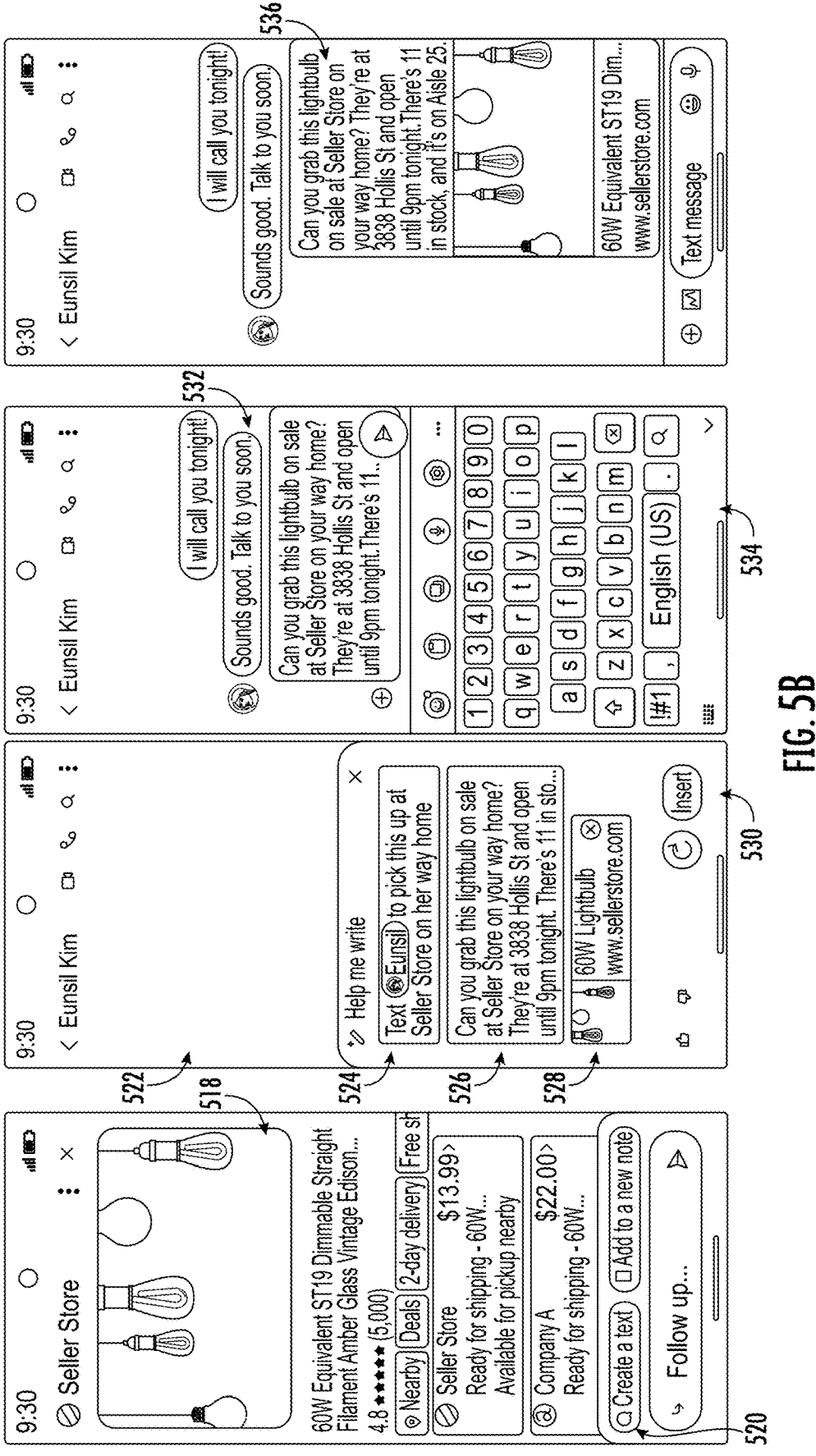

FIG. 5B depicts an illustration of an example application data push with the visual search interface. For example, a create-a-text suggestion can be selected. The create-a-text suggestion can be a particular application suggestion of the plurality of application suggestions 520. A text message application of the computing device can then be opened. The text composing interface can include a sent and received messages viewing panel 522. An overlay interface 524 can be provided to aid with composing a message. The overlay interface 524 can depict a model-generated prompt (and/or a user input prompt) that can be processed to generate a model-generated message 526. The model-generated prompt may be generated based on the visual search data and/or the selection of the particular application suggestion. The model-generated message 526 can be sent with a data packet 528 with the web page 518.

An "insert" user interface element 530 may be selected to insert the model-generated message 526 and the data packet 528 to text message application (e.g., inserted into an input text box 532 of the messaging application), which may be supplemented via inputs to a graphical keyboard interface 534. The model-generated message 526 and data packet 528 can then be sent as a text 536 to a second user.

Figure 5C:
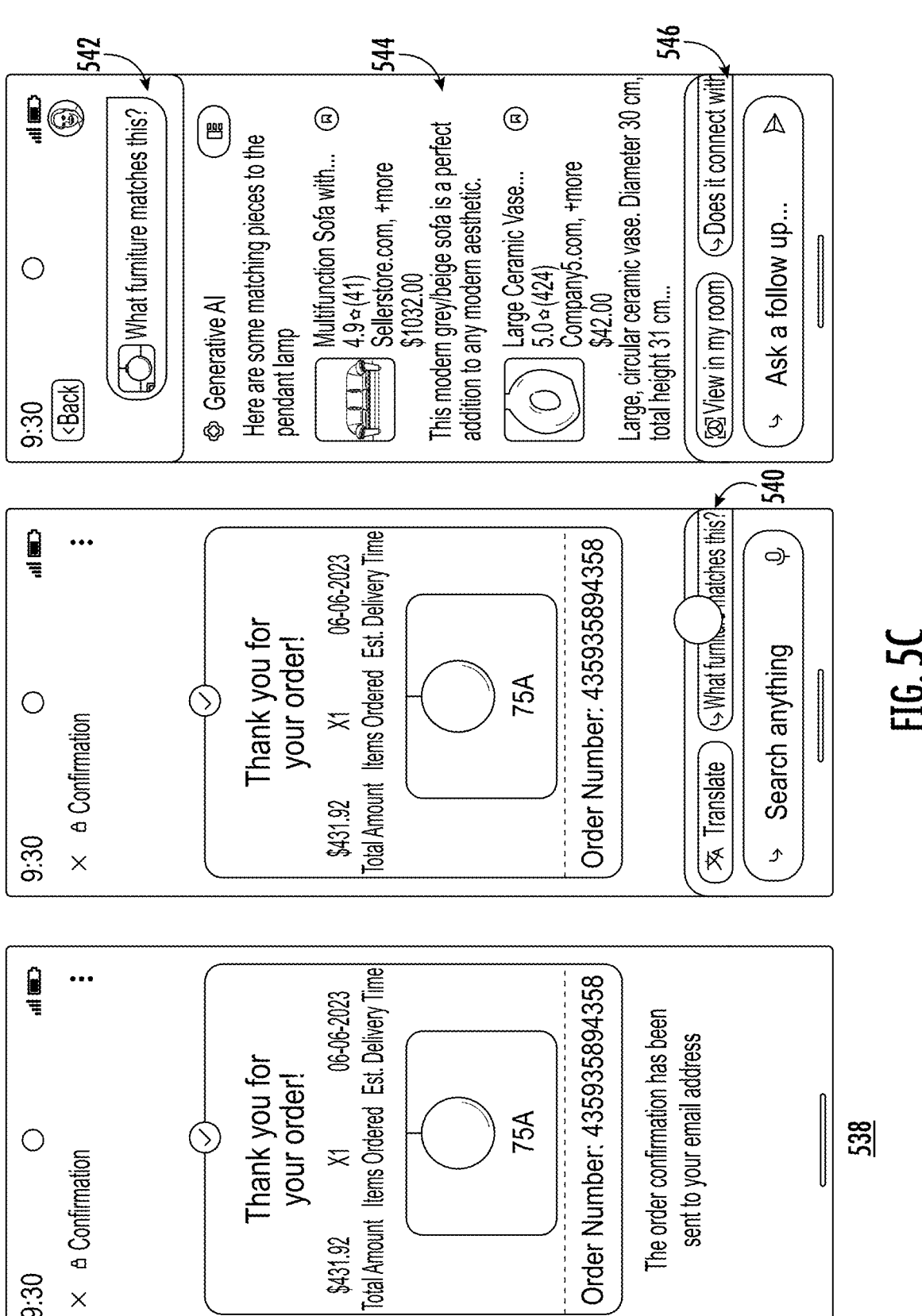

FIG. 5C depicts an illustration of an example visual search of an order confirmation page 538. The order confirmation page 538 may be processed to determine an action suggestion and one or more query suggestions 540. A particular query suggestion (e.g., "What furniture matches this?") of the one or more query suggestions 540 may be selected. The selected query suggestion and a screenshot of the order confirmation page 538 can be utilized as a multimodal query 542. The multimodal query 542 may be processed with a search engine and/or one or more machine-learned models. A plurality of search results 544 may be determined based on the multimodal query 542, In some implementations, the plurality of search results 544 may be formatted and/or augmented based on processing the web resource data with a generative model. The plurality of search results 544 can be associated with furniture that matches the color, style, and/or aesthetic of the recently ordered lamp. In some implementations, the plurality of search results 544 may be formatted such that only one furniture item from a particular class may be provided for each class. The search result products may be filtered and/or determined based on user location, user budget, user preferences, and/or other context data.

The plurality of search results 544 can be provided for display with a suggestion carousel 546 that includes an application suggestion and one or more updated query suggestions. The application suggestion and the one or more updated query suggestions may be determined based on the plurality of search results 544. The application suggestion may be selectable to navigate to an augmented-reality application that can be utilized to render one or more of the search result products into a user environment.

Figure 5D:
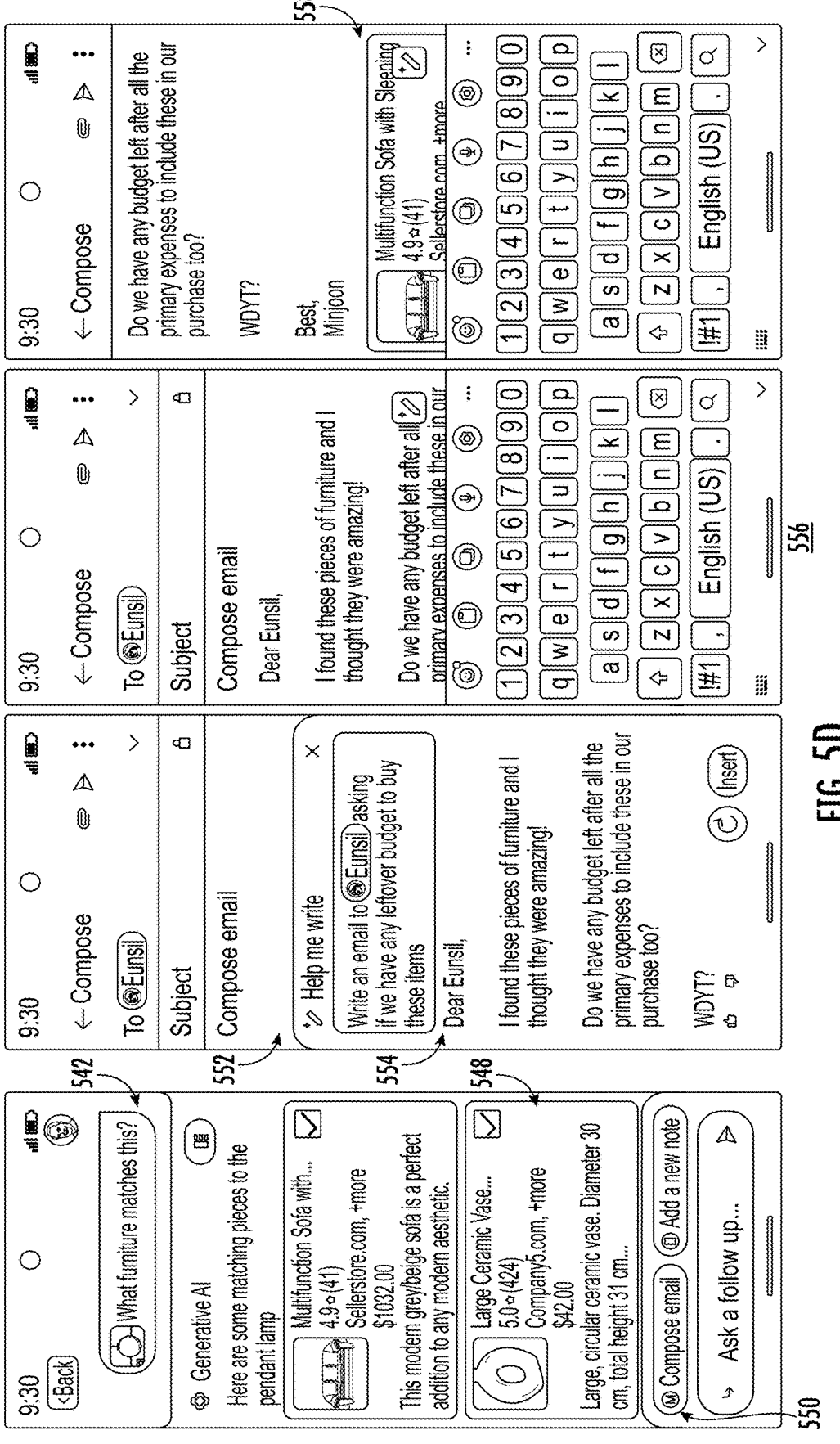

FIG. 5D depicts an illustration of an example data transmission to an application on the computing device. For example, a subset 548 of the plurality of search results 544 may be selected. Based on the selected subset 548, the suggestion panel 550 may be updated to include a plurality of different application suggestions. An email application suggestion may be selected, which can cause an email application 552 to be opened with an overlay message composing interface. A prompt may be generated based on the selected subset 548 and/or based on one or more user inputs. The prompt can be processed to generate a model-generated message 554, which can then be added to a draft email message 556 in the email application 552. The draft email message 556 can be sent with a data packet 558 descriptive of the selected subset 548. The data packet 558 may include a model-generated content item that includes details associated with the selected subset 548.

Figure 6A:
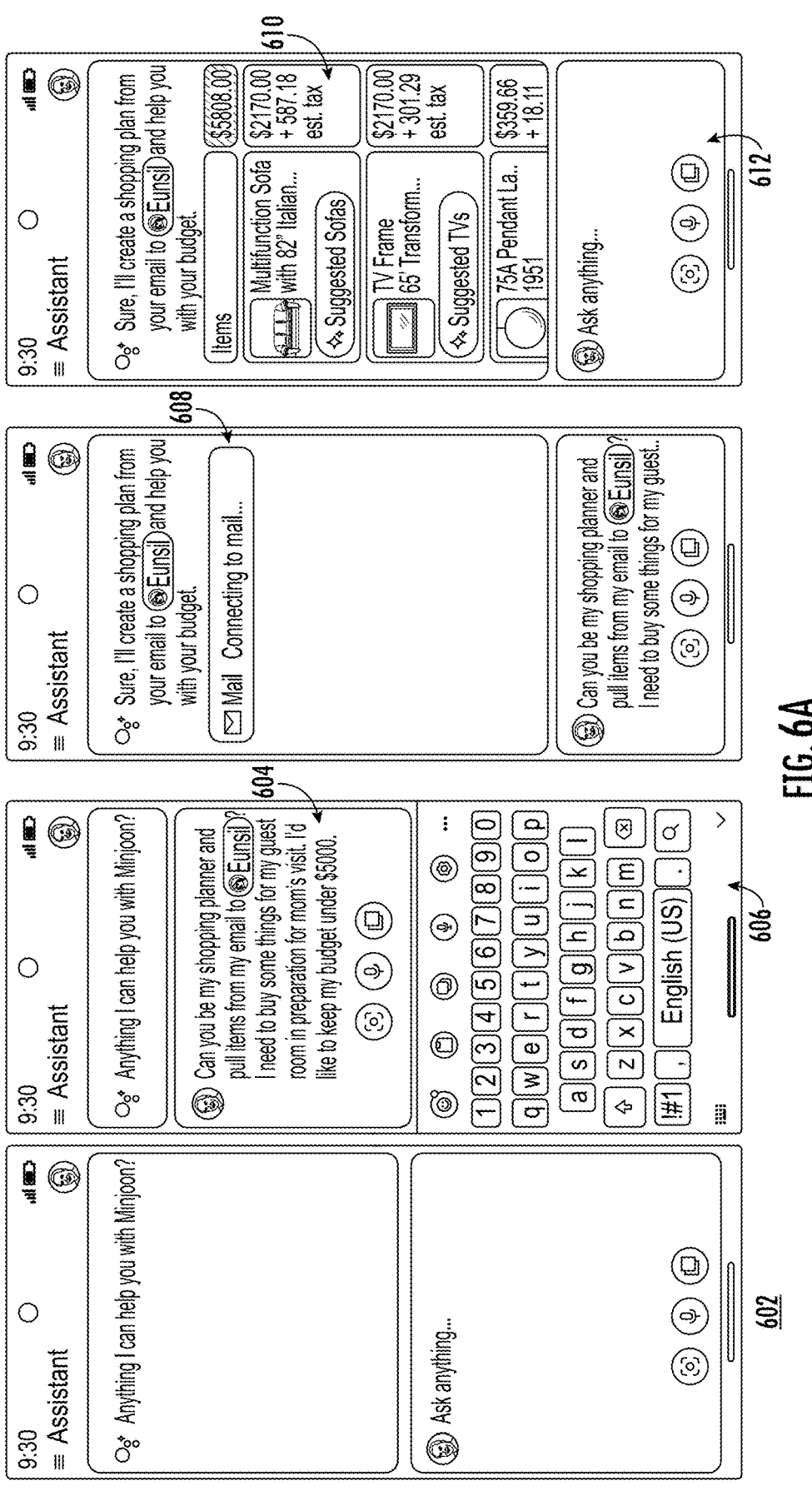
FIGS. 6A-6E depict illustrations of an example data call interface according to example embodiments of the present disclosure.

FIGS. 6A-6E depict illustrations of an example data call interface according to example embodiments of the present disclosure. FIG. 6A depicts an illustration of prompt generation and processing.

For example, a data call interface 602 can be opened and provided for display. The data call interface 602 can be part of a visual search interface that is implemented via an operating system of a computing device. A graphical keyboard interface 606 can be utilized to obtain inputs from a user to generate (or compose) the prompt 604. The prompt 604 can include a request for information from one or more particular applications. The prompt can be processed to determine the particular application. The particular application can then be accessed 608 and searched based on an application call generated based on the prompt 604. A status response may be provided as data is obtained from the one or more particular applications.

A plurality of content items can be obtained from the one or more particular applications based on the prompt 604. The plurality of content items can be processed with a machine-learned model to generate a structured output 610 that provides information from the plurality of content items in an organized format. A freeform input box 612 may be provided to obtain follow-up inputs to augment, supplement, and/or perform actions based on the structured output 610 (e.g., perform a search based on the structured output 610).

Figure 6B:
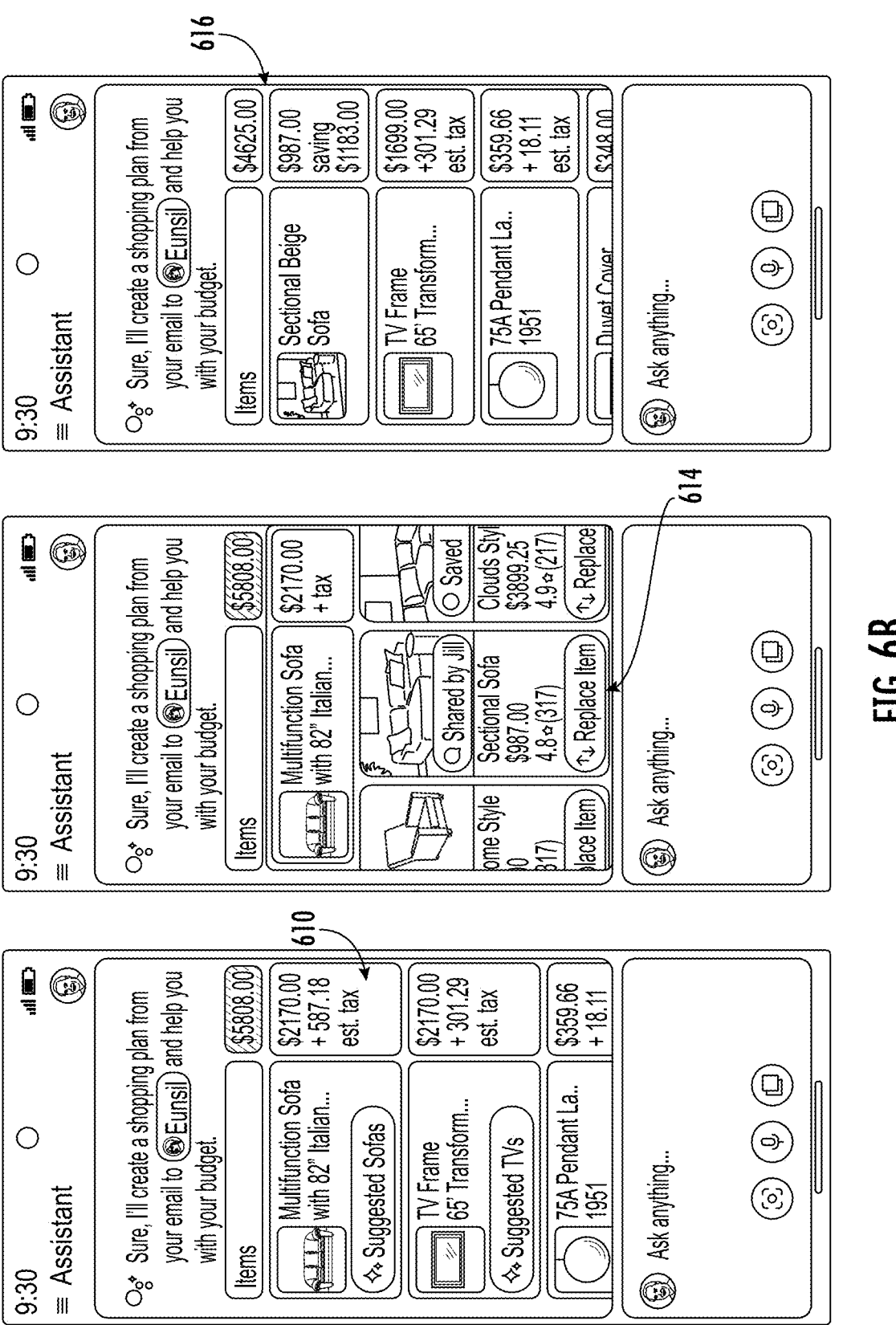

FIG. 6B depicts an illustration of structured output augmentation. The user may be budget conscious, and the structured output 610 may indicate that a current model-generated wish list is above budget. A user may select a particular item on the wish list to replace to (a) meet a budget and/or (b) replace the item with a different product based on one or more user preferences. The system can process a selection of a "suggest sofas" option to determine products of the particular product type that match a style, aesthetic, price range, and/or other preferences for the user. A plurality of product alternatives can then be provided for display in a carousel interface 614 for a user to view and select to augment the structured output. The plurality of product alternatives may be obtained from one or more applications and/or from the web. A particular alternative may be selected by the user and may be processed to generate an augmented structured output 616 that updates at least a portion of the structured output 610.

Figure 6C:
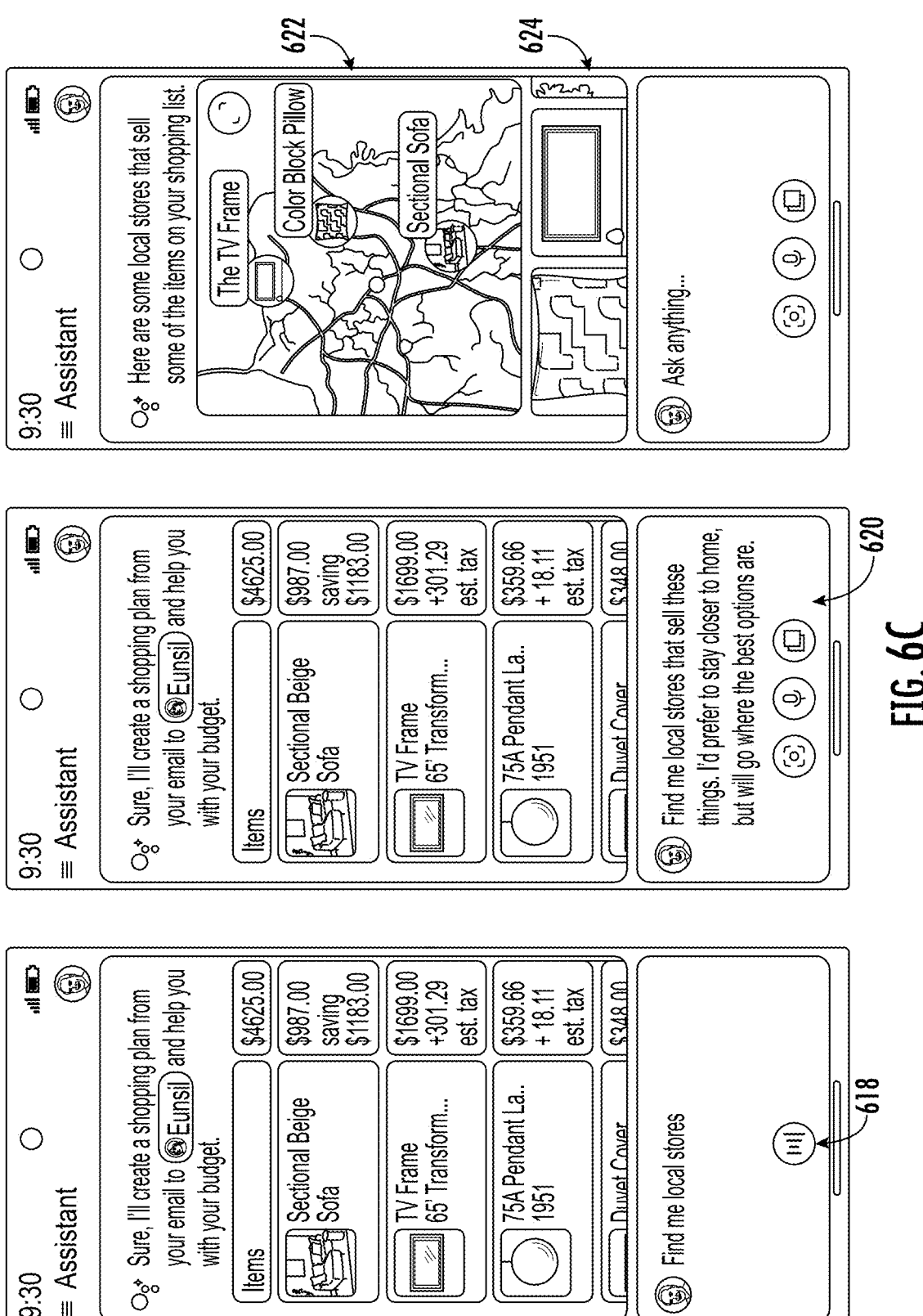

FIG. 6C depicts an illustration of follow-up prompt generation and processing. The user may provide a voice command input 618 that may be transcribed to generate a second prompt 620. The second prompt 620 and the augmented structured output 616 can be processed to generate a graphical representation 622. The graphical representation 622 can include a map graphic with one or more indicators of locations that carry one or more products from the augmented structured output 616. Additionally and/or alternatively, images 624 and/or other content items can be provided for display with the graphical representation 622.

Figure 6D:
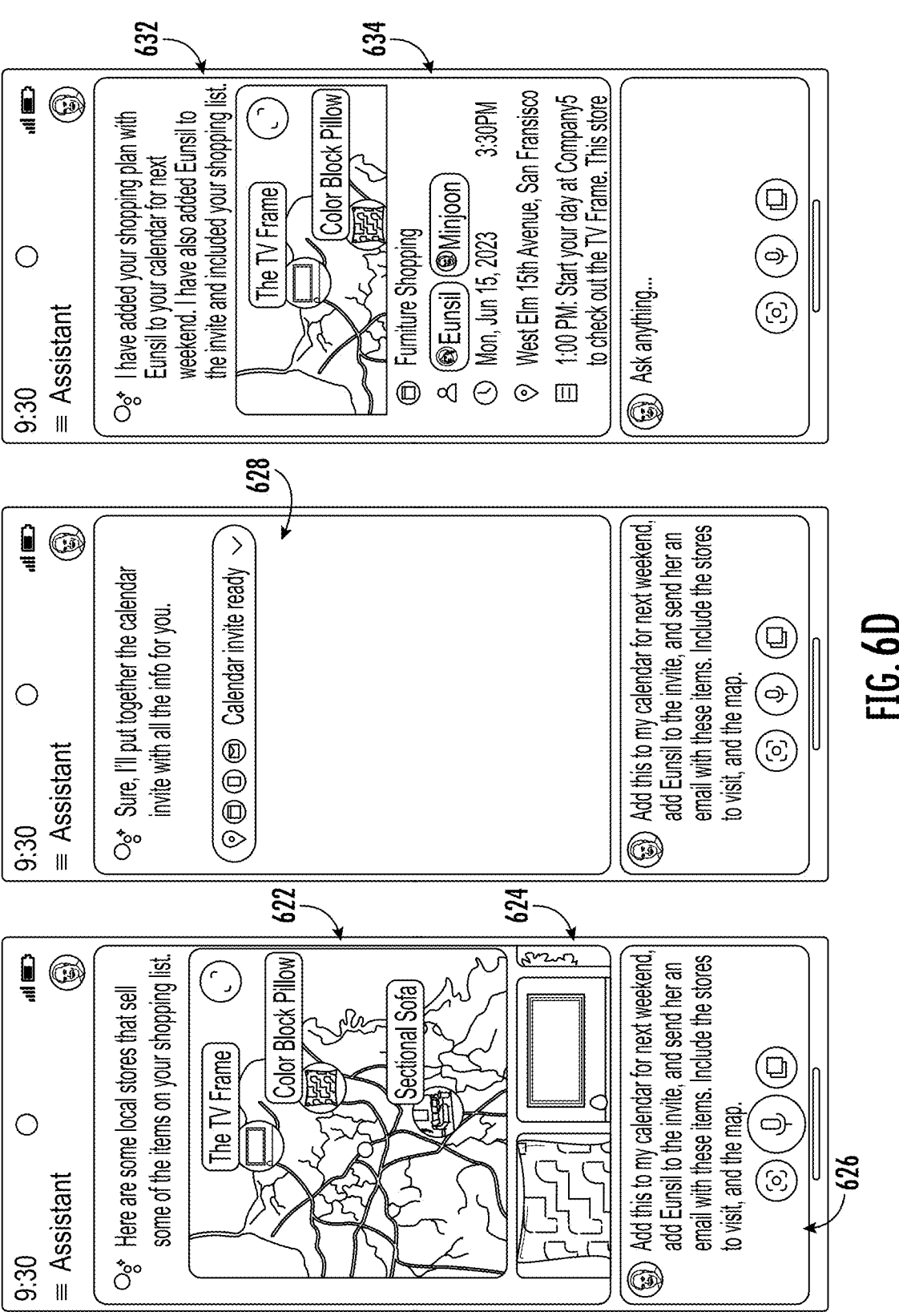

FIG. 6D depicts an illustration of calendar invite generation. For example, a user can provide a third prompt 626 that can be processed 628 by the system to generate a calendar invite 634. The calendar invite 634 can include information associated with the third prompt 626 and the graphical representation 622. The calendar invite 634 can be displayed with a model-generated natural language response 632 to the third prompt 626. The calendar invite 634 can include a title, the graphical representation 622 with a suggested route, a date, one or more locations, and/or a proposed itinerary 636.

Figure 6E:
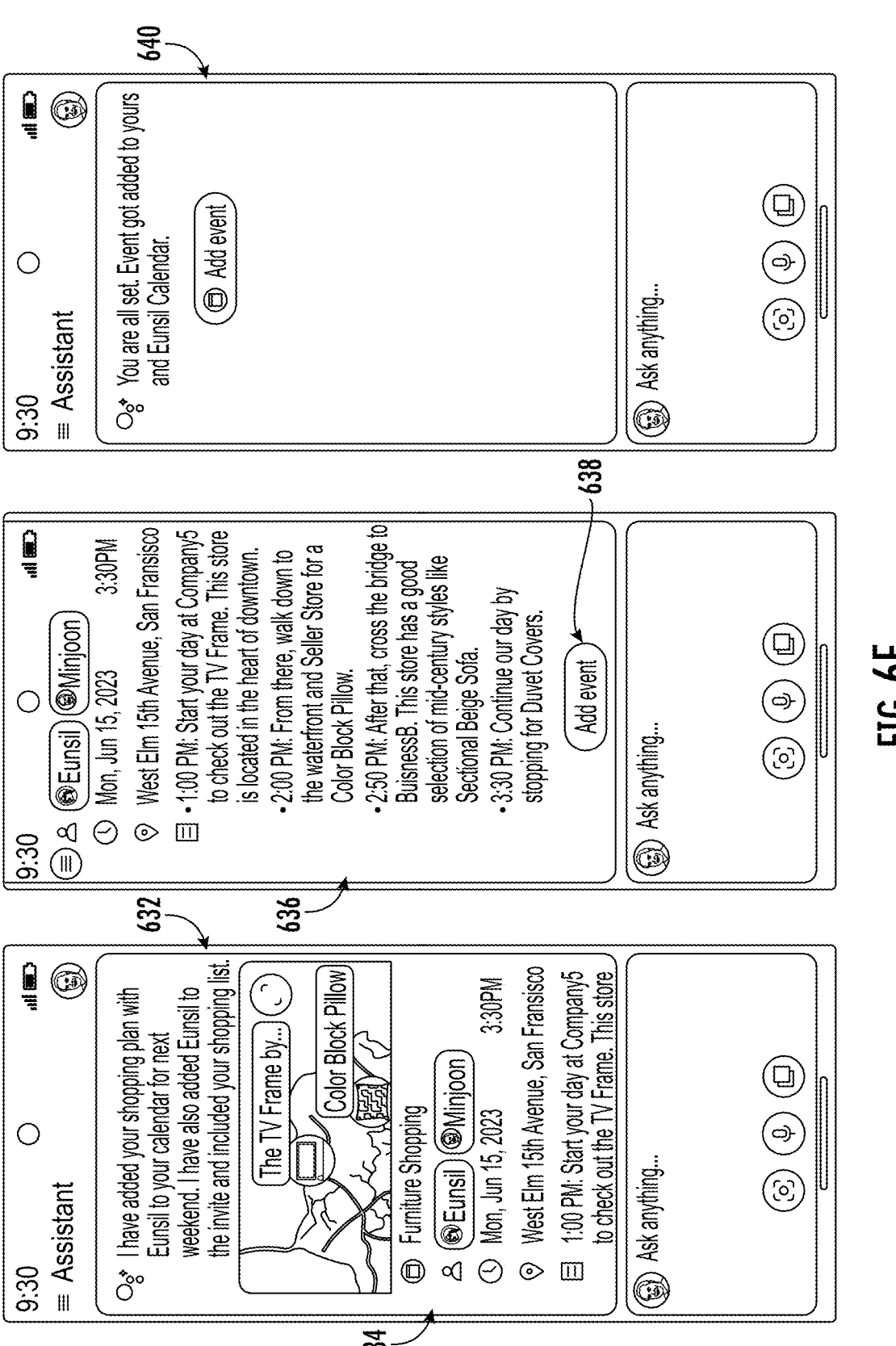

FIG. 6E depicts an illustration of the calendar invite transmission to a calendar application. The calendar invite 634 may include an option to add the event 638 to a calendar. The calendar invite 634 may then be added and can then be viewed 640 in the calendar application on the device.

Figure 7A:
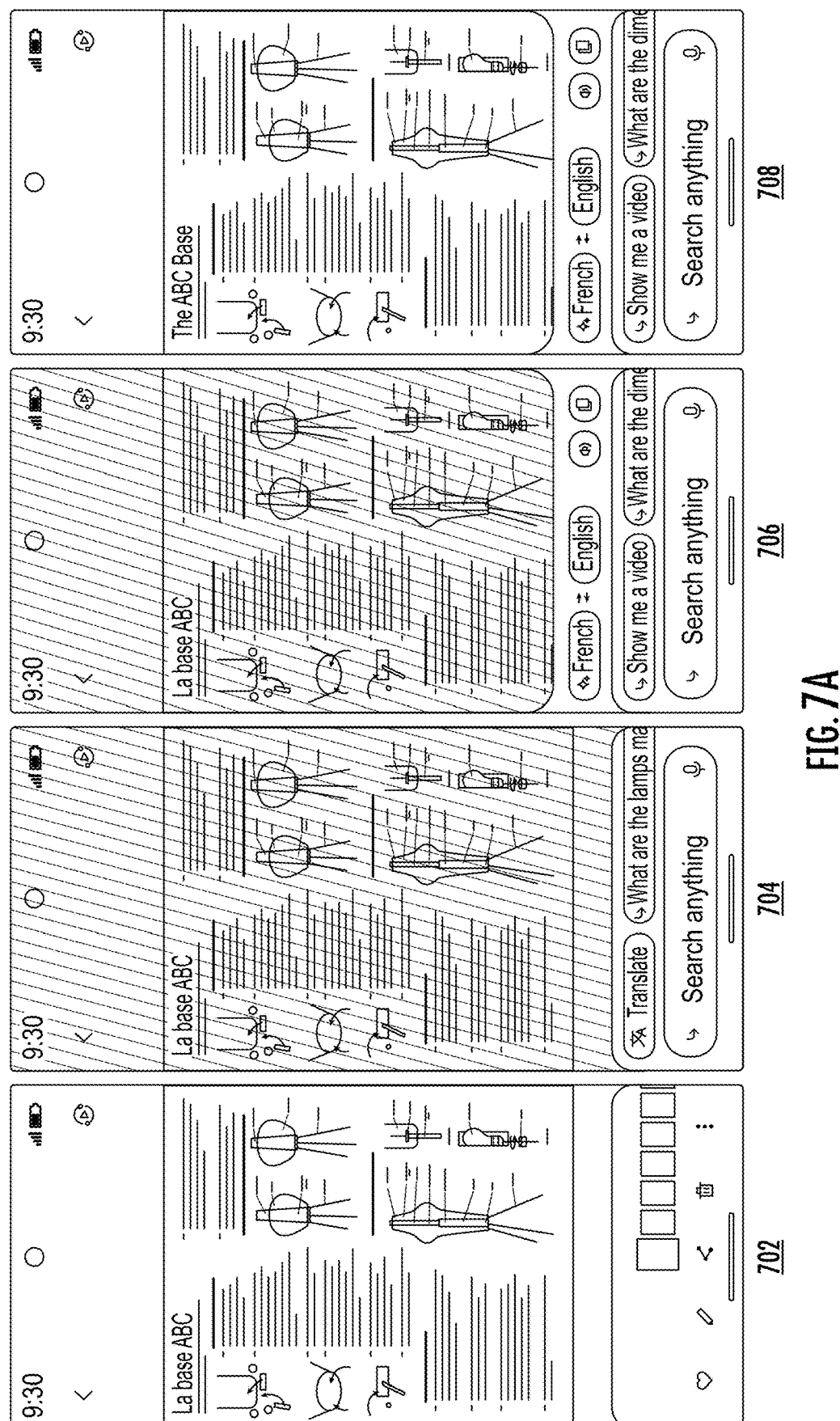
FIGS. 7A-7B depict illustrations of an example on-device display data processing interface according to example embodiments of the present disclosure.
Figure 7B:
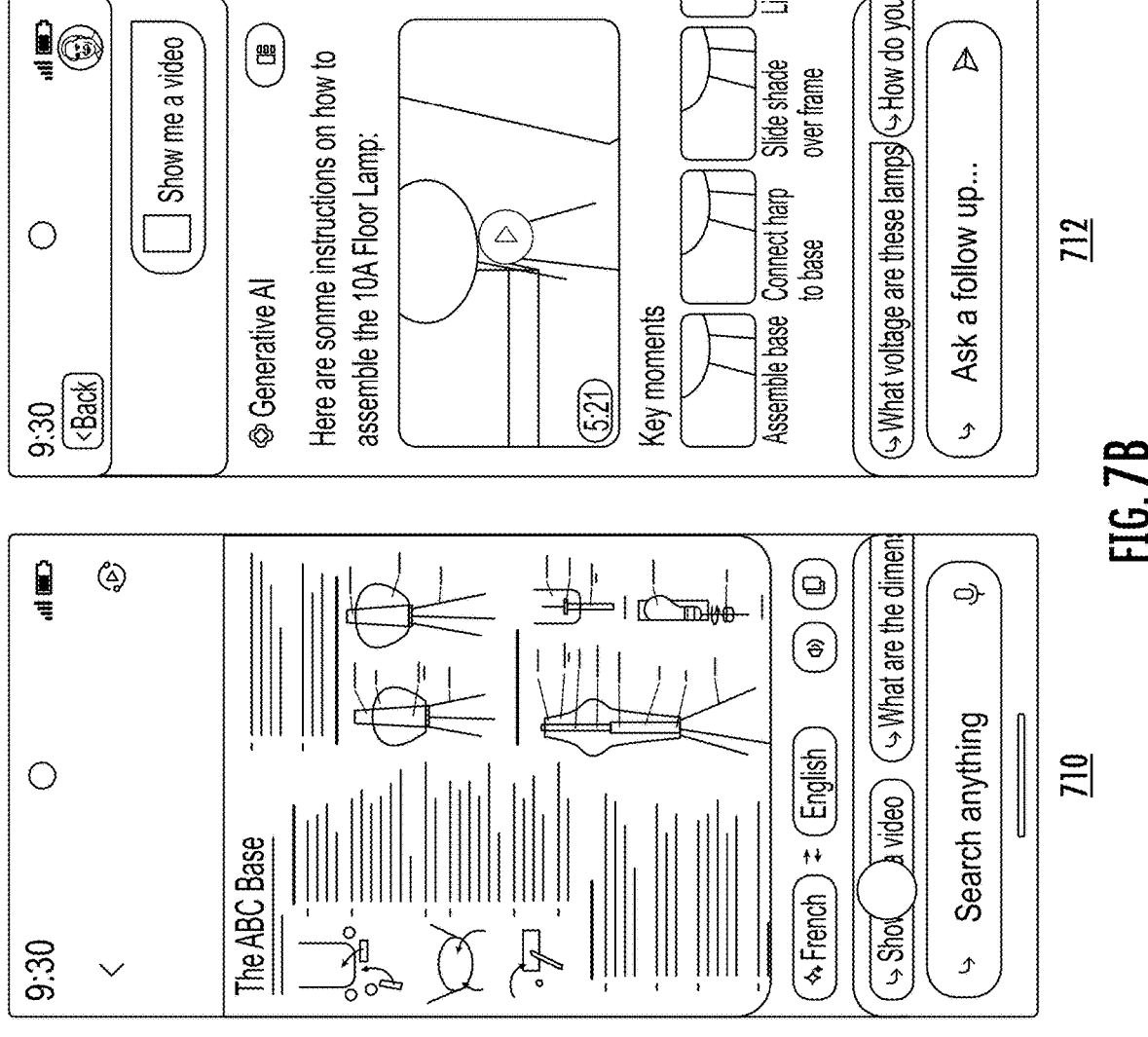

FIGS. 7A-7B depict illustrations of an example on-device display data processing interface according to example embodiments of the present disclosure. For example, FIG. 7A depicts an illustration of the overlay interface being opened and utilized to process a displayed document 702. The displayed document 702 can include a manual for a product, a textbook, and/or another content item. A user may provide an input to open an overlay interface, which can open an input screen 704. The input screen 704 can include a filter over the display data, one or more action suggestions, one or more query suggestions, and a query input box.

A user may select an action suggestion to open an action interface (e.g., a translation interface 706). The action interface can be interacted with to perform one or more processing techniques, which can include translation, object detection, optical character recognition, data augmentation, object segmentation, classification, annotation, parsing, and/or other data processing techniques.

For a translation interface 706, language options can be provided. In some implementations, the languages may be automatically determined based on determining the language of the displayed document 702 and determining a native language of the user (e.g., based on user preferences and/or settings). The translation interface 706 may include a text-to-speech option, a copy option, one or more query suggestions, and/or a query input box.

The translation can be performed based on the user inputs to generate a translated document 708 in the desired language. Alternatively and/or additionally, other document augmentations can be performed (e.g., format adjustments). The translation may be performed with one or more translation models, which may be stored on-device.

FIG. 7B depicts an illustration of a query suggestion for the translated document being selected (e.g., at 710 a selection is obtained). The query suggestion can be processed with the translated document 708 to determine visual search results 712 that are responsive to the multimodal query. The visual search results 712 can include a model-generated response that summarizes one or more web resources responsive to the query. In some implementations, the visual search results 712 can include images, articles, videos, and/or other data. The visual search results 712 may be provided with updated query suggestions that include predicted follow-up queries.

The visual search interface in the operating system of the computing device can be utilized to perform application suggestions based on visual searches. For example, visual search data can be processed to predict actions that may be of interest to the user based on the visual search data. The action predictions can be based on user-specific data, entity-action correlation, global historical data, and/or other data. The action predictions can be utilized to determine one or more applications on a computing device that can perform the actions. The visual search interface in the operating system can then provide options to navigate to and/or interface with the applications to perform the suggested actions.

Figure 8:
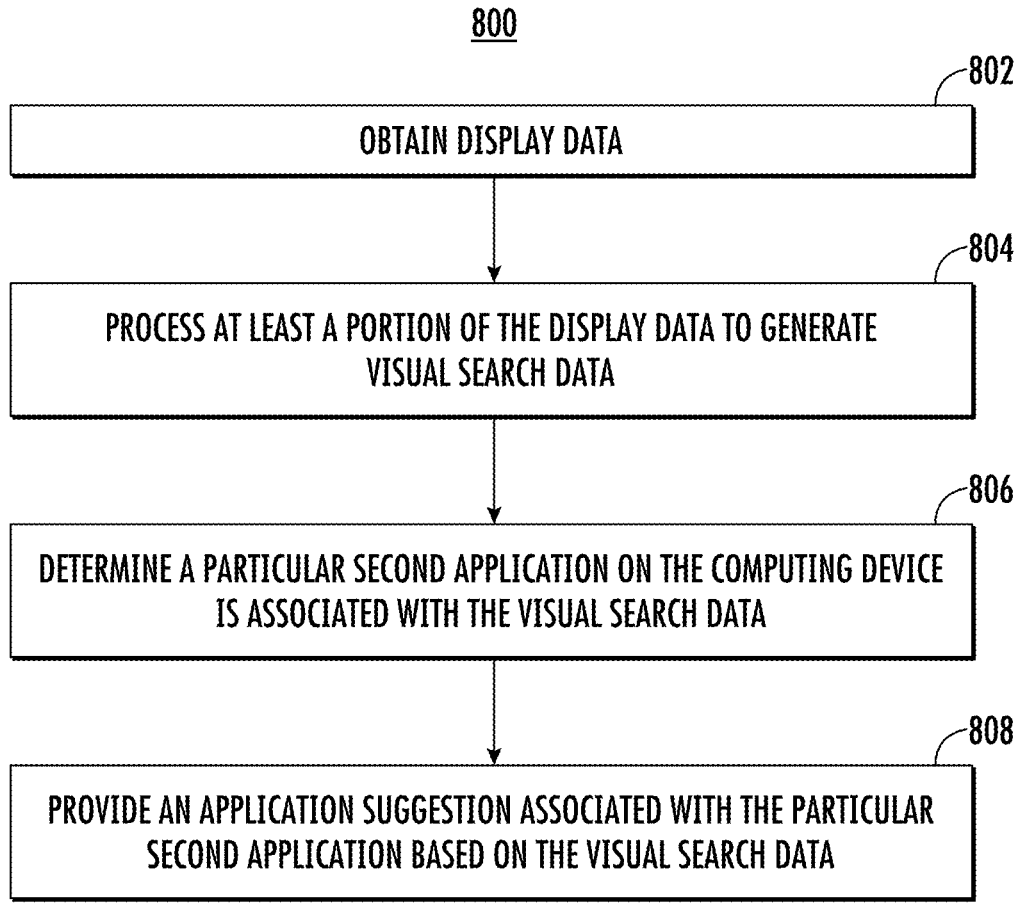
FIG. 8 depicts a flow chart diagram of an example method to perform a data push according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain display data. The display data can be descriptive of content currently presented for display in a first application on a user computing device. Obtaining the display data can include generating a screenshot. A screenshot can be descriptive of a plurality of pixels provided for display. In some implementations, the display data can be generated with a visual search application in the operating system. The visual search application can include an overlay application that is compatible to generate and process screenshots across a plurality of different applications on the user computing device. In some implementations, the display data can be obtained and processed based on a user input requesting a visual search overlay application. The display data can be descriptive of a plurality of pixels previously displayed before a visual search interface request was received. The display data can depict a first application interface with one or more content items (e.g., a social media interface with one or more social media posts in a social media application, an email interface with one or more messages in an email application, a news app interface with one or more news articles in a news application, etc.). The display data can include metadata associated with a context (e.g., time, an application currently provided for display, duration for display, and/or historical data). In some implementations, the display data can include one or more images, text data, audio data, one or more embeddings, latent representation data, and/or cryptographic data.

At 804, the computing system can process at least a portion of the display data to generate visual search data. The visual search data can include one or more visual search results. The one or more visual search results can be associated with detected features in the display data. The display data may be processed with one or more machine-learned models to generate one or more outputs associated with detected features. For example, the display data (e.g., one or more images of the display data) can be processed with an object detection model to generate one or more bounding boxes associated with the location of detected objects in the captured display. The one or more bounding boxes and the display data may be processed with a segmentation model to generate masks for each of the detected objects to segment the objects from the one or more images of the display data and/or generate detailed outlines of the objects that indicate object boundaries. In some implementations, the segmented objects may be processed with a search engine and/or one or more additional machine-learned models to generate the visual search data. The search engine may determine one or more visual search results based on detected features in the image segments, an embedding search (e.g., embedding neighbor determination), one or more object classifications, one or more image classifications, application classification, and/or multimodal search (e.g., search based on the image segment and text data (e.g., input text, metadata, text labels, etc.)). In some implementations, the display data can be processed with an optical character recognition model to identify text in the one or more images of the display data. The text can be utilized to condition the search.

In some implementations, the one or more visual search results can include reverse image search results. The one or more visual search results can be determined based on detected features. The one or more visual search results can include similar images to the one or more images of the display data, can include similar objects to detected objects in the display data, can include similar interfaces to detected user interface features in the display data, determined caption data, determined classifications, and/or other search result data. The visual search data may include an output of the one or more classification models, one or more augmentation models, and/or one or more generative vision language models. For example, the display data may be processed with a machine-learned vision language model to generate a predicted caption for the display data.

In some implementations, processing at least a portion of the display data to generate visual search data can include processing the display data with one or more on-device machine-learned models to generate a segmented portion of the display data. The segmented portion of the display data can include data descriptive of a set of features of the content presented for display. The computing system can transmit the segmented portion of the display data to a server computing system and receive visual search data from the server computing system. The visual search data can include one or more search results. The one or more search results can be associated with detected features in the segmented portion of the display data. The visual search data may include the one or more search results and a model-generated knowledge panel. In some implementations, the model-generated knowledge panel can include a summary of a topic associated with the segmented portion of the display data. The summary can be generated by processing web resource data with a language model. For example, one or more visual search results can be determined based on the segmented portion. Content items (e.g., articles, images, videos, audio, blogs, and/or social media posts) associated with the one or more visual search results can be processed with a generative language model (e.g., an autoregressive language model, which may include a large language model) to generate the summary in a natural language format. The one or more on-device machine-learned models can include an object detection model and a segmentation model stored on the user computing device.

Alternatively and/or additionally, processing the portion of the display data to generate the visual search data can include processing the display data with an object detection model to determine one or more objects are depicted in the display data and generating a segmented portion of the display data. The segmented portion can include the one or more objects. Processing the portion of the display data to generate the visual search data can include processing the segmented portion of the display data to generate the visual search data. The object detection model can generate one or more bounding boxes. The one or more bounding boxes can be descriptive of a location of the one or more objects within the content currently presented for display. In some implementations, generating the segmented portion of the display data can include processing the display data and the one or more bounding boxes with a segmentation model to generate the segmented portion of the display data. The object detection model and the segmentation model can be machine-learned models. The object detection model and the segmentation model may be stored on the user computing device. In some implementations, processing the portion of the display data to generate the visual search data can be performed on-device.

At 806, the computing system can determine a particular second application on the computing device is associated with the visual search data. For example, the computing system can process the visual search data with a machine-learned suggestion model to determine a second application is associated with the one or more visual search results. The second application can differ from the first application that depicted the content that was processed to generate the display data. The first application and second application can differ from the overlay application that performed the display data generation and processing. The machine-learned suggestion model can be trained to identify topics and/or entities associated with the visual search data. The identified entities and/or topics can then be leveraged to determine an action associated with the given entity and/or topic. The actions can include messaging another user, opening a map application, purchasing a product, viewing an augmented-reality and/or virtual-reality asset, adding to notes, adding to a gallery database, and/or other actions. Based on the determined action, an application on the device can be determined to be associated with the visual search data based on that action being able to be performed by the application. The machine-learned suggestion model may be trained to process visual search data, determine a topic and/or entity classification, and then determine whether the classification is associated with the one or more applications on the device. The machine-learned suggestion model may be trained to generate a natural language suggestion and/or a multimodal suggestion (e.g., an icon and text) that indicates the application and a proposed action. The application suggestion may include a data packet and/or a prompt that can be transmitted to the second application if the application suggestion is selected.

In some implementations, the computing system can determine a plurality of candidate second applications are associated with the visual search data and can provide a plurality of application suggestions for display in a suggestion panel. The suggestion panel can include the plurality of application suggestions and one or more query suggestions. The one or more query suggestions can be determined based on the display data and/or the one or more visual search results.

At 808, the computing system can provide an application suggestion associated with the particular second application based on the visual search data. The application suggestion can be provided with an icon indicator of the application and an action suggestion. The application suggestion can be provided for display with the one or more visual search results.

In some implementations, the computing system can receive a selection of the application suggestion and transmit data to the second application based on the selection. For example, the computing system can obtain a selection of the application suggestion to transmit at least a portion of the visual search data to the particular second application and generate a model-generated content item (e.g., a visual search summary, a content item summary, an image caption, an augmented image, a generated table, etc.) based on the selection of the application suggestion. The model-generated content item can be generated with a generative model (e.g., a generative language model, a generative image model, etc.) based on the portion of the visual search data. The computing system can provide the model-generated content item to the particular second application. In some implementations, the generative model can include a generative language model that generates a natural language output based on processing features of input data. The first application associated with content provided for display when the display data was generated and the particular second application can differ. The particular second application may include a messaging application, and the model-generated content item may include a model-composed message to a second user. The model-generated content item can be generated with a generative language model. Alternatively and/or additionally, the model-generated content item can include a model-generated list that organizes a plurality of user-selected visual search results. The model-generated list may be generated with a generative language model that organizes the plurality of user-selected visual search results and generates natural language outputs for each of the plurality of user-selected visual search results. Providing the model-generated content item to the particular second application can include transmitting the model-generated content item to the second application via an application programming interface.

In some implementations, obtaining the selection of the application suggestion to transmit at least the portion of the visual search data to the second application can include determining a plurality of application-transmission actions associated with the visual search data. The plurality of application-transmission actions can be associated with a plurality of candidate second applications to transmit data associated with the visual search data. Obtaining the selection of the application suggestion to transmit at least the portion of the visual search data to the second application can include providing a plurality of selectable options based on the plurality of application-transmission actions. The plurality of selectable options can be associated with the plurality of application-transmission actions. The plurality of selectable options can include the application suggestion. The plurality of application-transmission actions can include the particular second application. Additionally and/or alternatively, obtaining the selection of the application suggestion to transmit at least the portion of the visual search data to the second application can include receiving a selection of the application suggestion. The application suggestion can be associated with the particular second application.

In some implementations, generating the model-generated content item based on the selection of the option can include processing the visual search data and data associated with the particular second application to determine a suggested prompt, receiving input selecting the suggested prompt, and processing the suggested prompt and the visual search data with the generative model to generate the model-generated content item. The model-generated content item can then be transmitted to the second application.

Additionally and/or alternatively, the computing system can determine a plurality of application suggestions. For example, the computing system can process the visual search data to determine a plurality of candidate second applications that are associated with the one or more search results, obtain a selection of a particular application suggestion to transmit at least a portion of the visual search data to a particular second application of the plurality of candidate second applications, obtain a model-generated content item based on the selection of the particular application suggestion, and provide the model-generated content item to the particular second application. The model-generated content item may have been generated with a generative model based on the portion of the visual search data.

Figure 9:
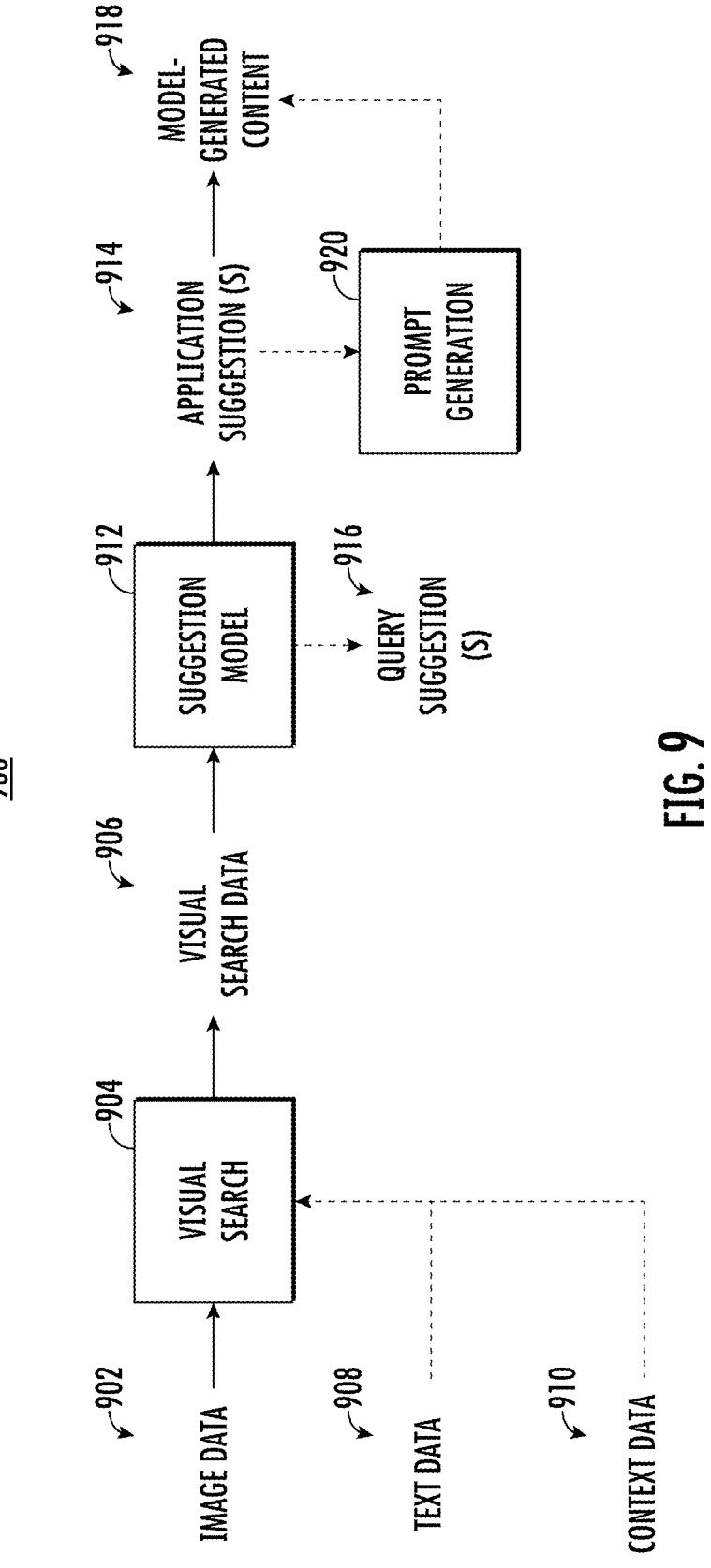
FIG. 9 depicts a block diagram of an example application suggestion system according to example embodiments of the present disclosure.

FIG. 9 depicts a block diagram of an example application suggestion system 900 according to example embodiments of the present disclosure. In particular, the application suggestion system 900 can process image data 902 to determine and/or generate visual search data 906 that can then be processed to determine one or more application suggestions 914.

For example, image data 902 can be obtained. The image data 902 can be descriptive of content previously provided for display by a computing device. The image data 902 can include one or more images and may be descriptive of one or more objects. The image data 902 can be descriptive of a previously displayed application, which can include the application interface and one or more content items.

The image data can be processed to perform visual search 904 to generate visual search data 906. Visual search 904 can include object detection, optical character recognition, image segmentation, object classification, generative model processing, and/or search engine processing. The visual search 904 may include processing the image data 902 with text data 908 and/or context data 910 to determine one or more visual search results, which may be associated with one or more web resources. The text data 908 may include user input text, predicted text, a selected text suggestion, extracted text, and/or text labels. The context data 910 can include metadata. In some implementations, the context data 910 can be associated with a time, a location, search history, browsing history, application history, user profile data, a personalized model, and/or other contexts.

The visual search data 906 can be descriptive of one or more visual search results associated with the image data 902. The one or more visual search results can include images, text, audio, videos, and/or other search result data. The visual search data 906 may include one or more object classifications and/or one or more image classifications. The visual search data 906 may include a model-generated response that may be generated by processing one or more web resources associated with the one or more visual search results to generate a natural language response to the image query.

The visual search data 906 can be processed with a suggestion model 912 to determine one or more application suggestions 914 and/or one or more query suggestions 916. The one or more query suggestions 916 can include suggested follow-up queries based on the contents of the one or more visual search results and/or based on a topic and/or sub-topic determination associated with the image data 902 and/or the one or more search results. The one or more application suggestions 914 can include applications on the computing device determined to be associated with the image data 902 based on the visual search data 906. For example, the visual search data 906 may be processed to determine one or more topics, entities, and/or tasks associated with the one or more visual search results. Based on the one or more determined topics, entities and/or tasks, an application associated with the one or more visual search results can be determined.

In some implementations, one or more of the application suggestions 914 can be selected to transmit at least a portion of the visual search data 906 to a second application. Additionally and/or alternatively, the visual search data 906 and/or the one or more application suggestions 914 can be processed with a generative model to generate one or more model-generated content items 918 to transmit to a second application. The model-generated content item 918 may be generated by processing the application suggestion 914 and/or the visual search data 906 with a prompt generation model 920 to generate a prompt that is then processed with the generative model to generate the model-generated content item 918. The model-generated content item 918 can be descriptive of a summary and/or a representation of at least a portion of the visual search data 906 and may be configured and/or formatted based on the particular second application.

The visual search interface in the operating system may be utilized to interface with one or more applications on the computing device to aggregate data for the user. The aggregated data may be processed with one or more machine-learned models to generate an output that organizes the data in a format that conveys the information in a digestible manner.

Figure 10:
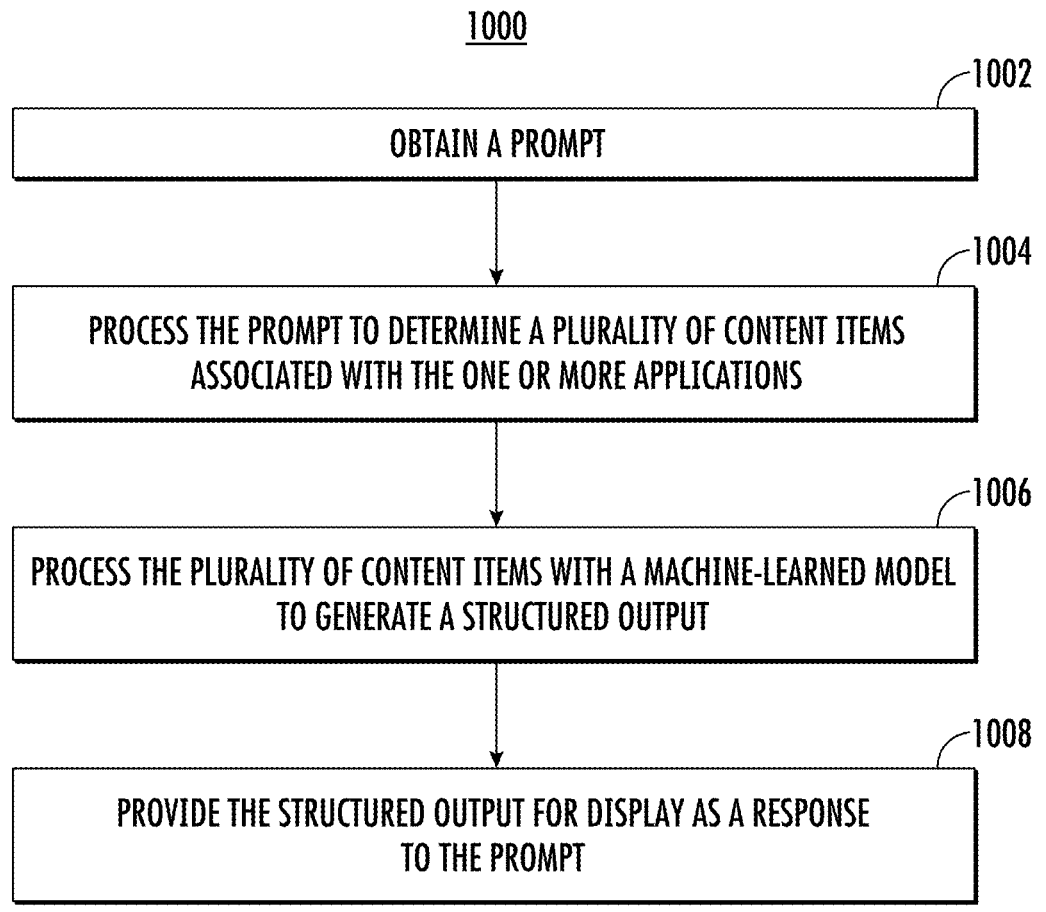
FIG. 10 depicts a flow chart diagram of an example method to perform a data call according to example embodiments of the present disclosure.

FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain a prompt. The prompt can be obtained by a computing device. The prompt can be descriptive of a request for information from one or more applications on the computing system and/or a particular computing device. The prompt can be obtained via an overlay interface. The overlay interface can be provided by the operating system. In some implementations, the prompt can include a multimodal prompt. The multimodal prompt can include text data and image data. The prompt may include an application call that indicates a particular application to access and obtain data from for the information retrieval. Alternatively and/or additionally, the one or more applications to access and search may be determined by identifying a topic, task, and/or entity associated with the request. In some implementations, the prompt can include text data, image data, audio data, latent encoding data, and/or context data. The prompt may include image data and text data that is descriptive of a task to perform with the image (e.g., search a particular social media application, a particular message application, and/or a particular image storage application for images with the chair in this image). The prompt may be descriptive of an application call to a plurality of applications to aggregate information associated with a particular topic (e.g., a room remodeling, clothes wish list, travel itinerary, story ideas, etc.).

At 1004, the computing system can process the prompt to determine a plurality of content items associated with the one or more applications. The plurality of content items can be determined by accessing data associated with the one or more applications on the computing device. In some implementations, the plurality of content items can include one or more multimodal content items (e.g., an email with text and one or more images, a product listing with images and text, and/or a video listing with a video and caption). The plurality of content items can be obtained from a plurality of applications on the computing device. One or more first content items may be obtained from a first application, and one or more second content items may be obtained from a second application. The first application and the second application can differ from an application that obtained the prompt. The one or more applications can include one or more messaging applications. In some implementations, the plurality of content items can include a plurality of messages determined to be associated with the prompt. The one or more applications may be determined based on processing the prompt with an application interface model that can determine the one or more particular applications that are associated with the prompt. The application interface model can process the prompt to generate an application call that can be utilized to interface with the one or more particular applications to access and obtain the plurality of content items. The application calls may be performed using one or more application programming interfaces. The one or more application programming interfaces may be implemented via the operating system of the computing device.

At 1006, the computing system can process the plurality of content items with a machine-learned model to generate a structured output. The structured output can include information from the plurality of content items distilled in a structured data format (e.g., a natural language output (e.g., an article, a story, a poem, etc.), an informational graphic (e.g., a table, Venn diagram, etc.), and/or a media content item (e.g., a video, an image, etc.)). The structured output can include formatting that differs from a native format of the plurality of content items. The structured output can include multimodal data. The machine-learned model can include a generative model (e.g., a generative language model, a generative text-to-image model, a generative vision language model, and/or a generative graph model).

In some implementations, the computing system can determine a plurality of objects associated with the plurality of content items and obtain a plurality of object details associated with the plurality of objects. The structured output can be generated based on the plurality of objects and the plurality of object details. Additionally and/or alternatively, the structured output can include a graphical representation. The graphical representation may include object data and detail data. The object data can identify the plurality of objects. The detail data can be descriptive of the plurality of object details. In some implementations, the structured output can include a plurality of object images associated with the plurality of objects. The structured output can include text descriptive of the plurality of object details.

At 1008, the computing system can provide the structured output for display as a response to the prompt. The structured output can be provided via the overlay interface. The structured output can be provided for display at the computing device. The structured output can be provided for display with the prompt and may include one or more options for storing, transmitting, and/or augmenting the structured output.

In some implementations, the computing system can obtain, at the computing device, a second prompt. The second prompt can be descriptive of a follow-up request to obtain additional information associated with the structured content. The computing system can process the second prompt and the structured output to determine additional content that is responsive to the follow-up request. The additional content can be determined based on determining the structured output is associated with one or more entities and determining the additional content is associated with the one or more entities. In some implementations, processing the second prompt and the structured output to determine the additional content can include determining one or more second applications are associated with the second prompt and obtaining the additional content by interfacing with the one or more second applications. The additional content can include additional details on the contents of the structured output, which can include location data for products listed in a model-generated table.

Additionally and/or alternatively, the computing system can generate a second structured output based on the additional content. Generating the second structured output based on the additional content can include processing the additional content to generate a graphical representation associated with the additional content. The plurality of content items can be associated with a plurality of different products. The structured output can include a table. In some implementations, the table can include a structured representation of details for the plurality of different products. The additional content can include one or more locations associated with the plurality of different products. The second structured output can include a graphical map with one or more indicators of the one or more locations.

In some implementations, the computing system can provide, at the computing device, the second structured output for display as a response to the second prompt. The second structured output may be displayed with the structured output and/or may replace the display location of the structured output. The second structured output may be provided for display with the prompt and may include one or more options for storing, transmitting, and/or augmenting the second structured output.

In some implementations, the computing system can determine the structured output is associated with one or more second applications. The computing system can generate an application suggestion based on the one or more second applications, obtain a selection of the application suggestion, and generate a data packet. The data packet can be descriptive of the structured output. The computing system can provide the data packet to the one or more second applications.

In some implementations, the computing system can obtain input data. The input data can be descriptive of a selection to input the structured output into a second application. The computing system can provide the structured output to the second application in response to the selection.

Alternatively and/or additionally, the computing system can obtain an augmentation input. The augmentation input can be descriptive of a request to adjust the structured output. The computing system can process the augmentation input and the structured output to generate an augmented structured output. The augmented structured output can include the structured output with one or more portions augmented. Processing the augmentation input and the structured output to generate the augmented structured output can include obtaining revision data based on the augmentation input and replacing a subset of the structured output with the revision data to generate the augmented structured output. The revision data can include manually input data, data obtained from the web, and/or data obtained from one or more applications on the computing device.

Figure 11:
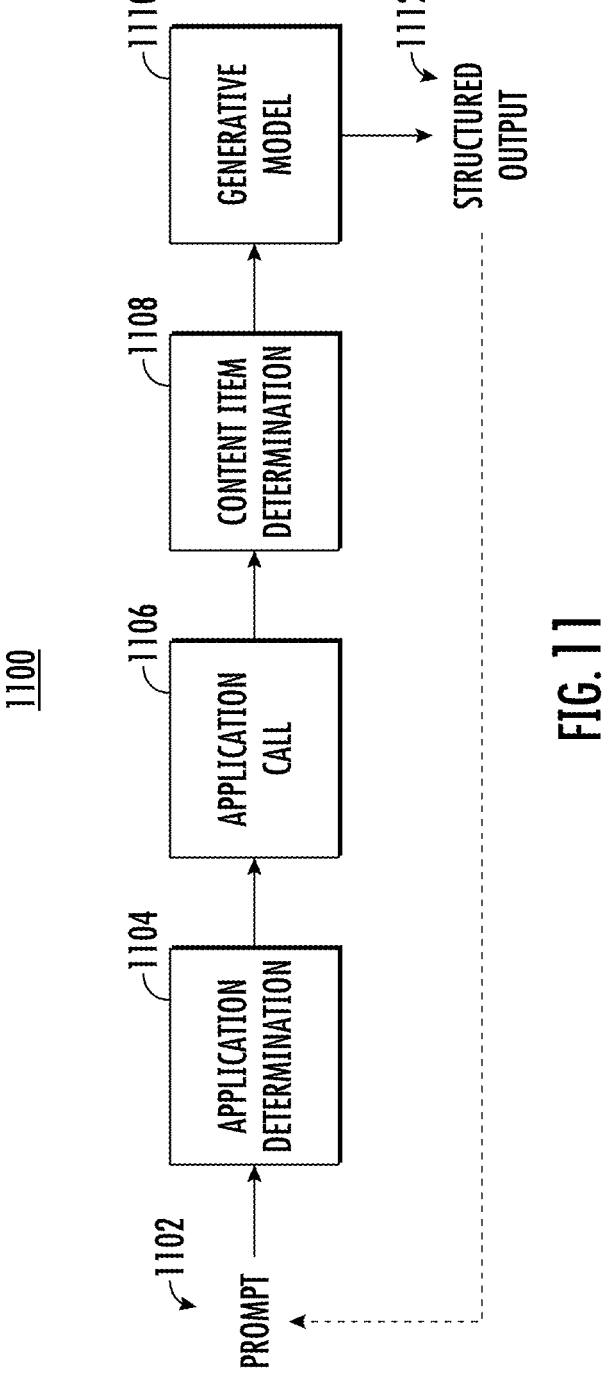
FIG. 11 depicts a block diagram of an example data aggregation system according to example embodiments of the present disclosure.

FIG. 11 depicts a block diagram of an example data aggregation system 1100 according to example embodiments of the present disclosure. In particular, the data aggregation system 1100 can process a prompt 1102, perform an application call 1106 to obtain content items from one or more applications, and generate a structured output 1112 based on the content items.

For example, a prompt 1102 can be obtained. The prompt 1102 can include a text string descriptive of a request for information. The prompt 1102 can include an indication of a particular application to obtain data from and/or may be an open request to be processed by the data aggregation system 1100 to determine which applications to pull data from for data aggregation. In some implementations, the prompt 1102 can include a multimodal prompt (e.g., text data and image data, audio data and image data, embedding data and text data, metadata and image data, etc.).

The prompt 1102 can be processed with an application determination block 1104 to determine one or more applications to access and search to obtain one or more content items. The applications may be determined based on determining the prompt is associated with one or more topics, tasks, and/or entities associated with one or more particular applications. Alternatively and/or additionally, the prompt 1102 can be parsed to determine the request is associated with a particular application (e.g., an explicit request and/or an implicit request). The one or more applications may include messaging applications (e.g., email, text, group chats, etc.), work management applications, storage applications (e.g., document management applications, media content item gallery applications, etc.), browser applications, search applications, notes applications, streaming applications, and/or other applications.

An application call 1106 can then be generated and performed based on the application determination. The application call 1106 may be facilitated by an overlay interface implemented in the operating system. In some implementations, the application call 1106 may be performed via an application programming interface and/or one or more other application interfacing systems. Content item determination 1108 can be performed based on the application call 1106. The content item determination 1108 can be utilized to determine a plurality of content items of the one or more applications are associated with the prompt 1102. Content item determination 1108 can include a key word search, an embedding search, an image search, data parsing, metadata search, etc.

The one or more content items can then be processed with a generative model 1110 to generate a structured output 1112 that includes information from the one or more content items. The structured output 1112 can include a natural language output, a graphical representation, a model-generated media content item, code, and/or other data. In some implementations, the format of the structured output 1112 can be based on the request of the prompt 1102. Alternatively and/or additionally, the format of the structured output 1112 may be based on determining a task, topic, and/or entity associated with the prompt 1102 and/or the content items.

In some implementations, the structured output 1112 may be provided with one or more action suggestions. For example, an augmentation option, a new prompt option, and/or a structured output interaction option may be provided to the user for selection. The augmentation option can be associated with an option to augment at least a portion of the structured output 1112, which can include adding new information based on manual user input, another application call, a web search, and/or other data acquisition. The augmentation may include a format change, a style change, data deletion, and/or content expansion (e.g., generating a long-form version of the structured output 1112 based on additional generative model 1110 processing). The new prompt option can include processing the structured output 1112 and/or a second prompt with the data aggregation system 1100 to generate a second structured output. The structured output interaction option can include storing the structured output 1112, transmitting the structured output 1112 to one or more applications and/or one or more users, and/or interacting with a user interface element of the structured output 1112.

Figure 12A:
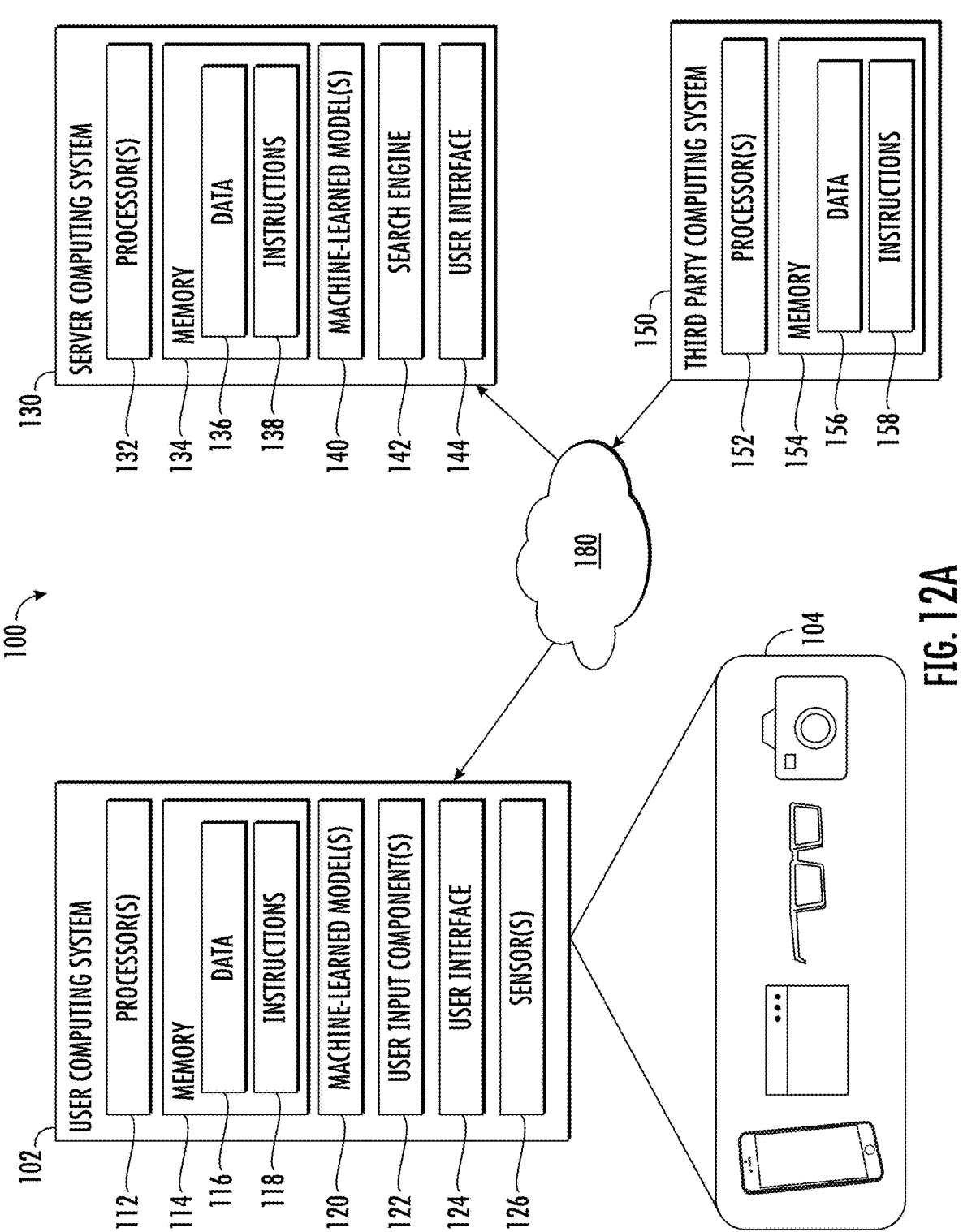
FIG. 12A depicts a block diagram of an example computing system that performs visual search at the operating system level according to example embodiments of the present disclosure.

FIG. 12A depicts a block diagram of an example computing system 100 that performs visual search according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 12B:
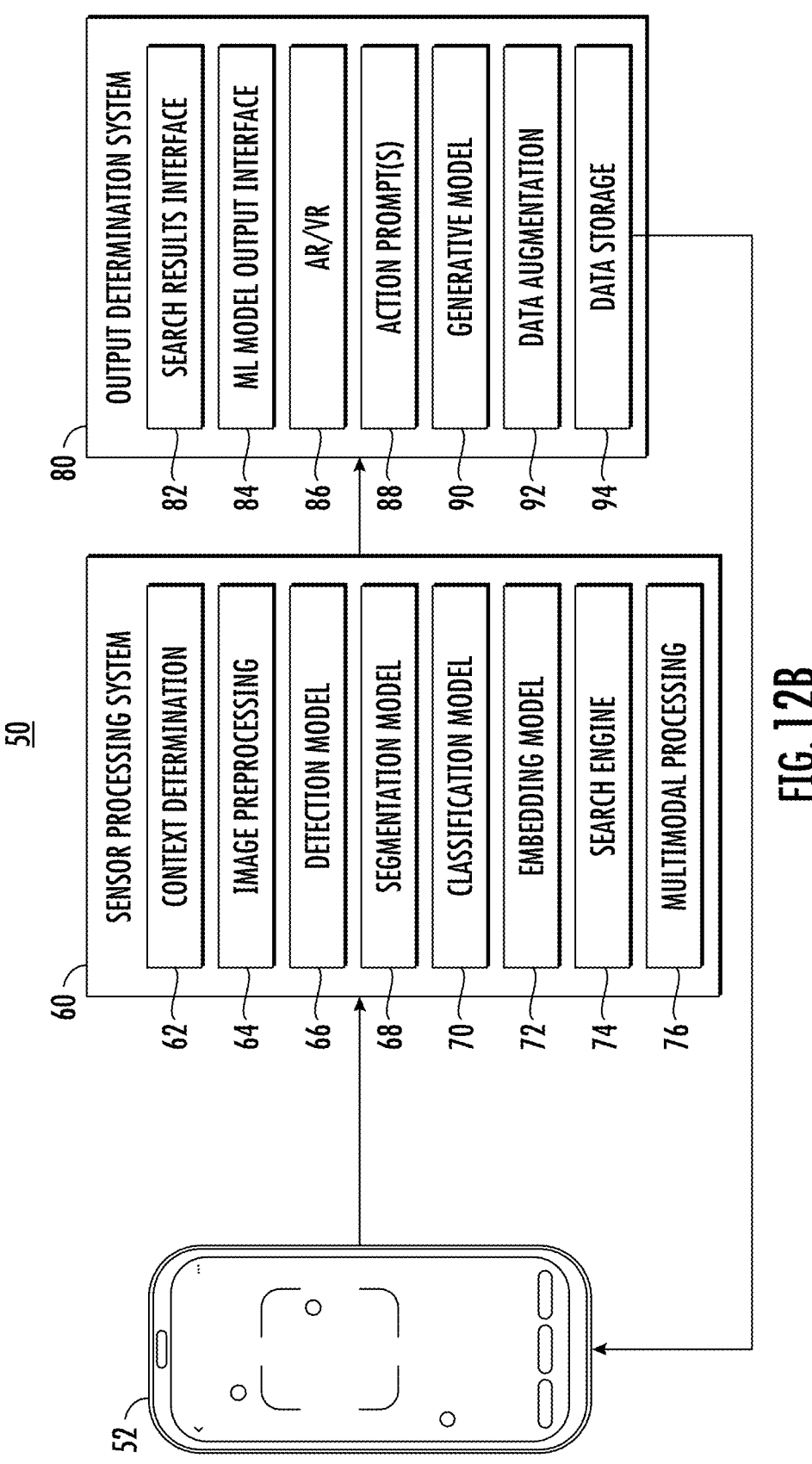
FIG. 12B depicts a block diagram of an example computing system that performs visual search at the operating system level according to example embodiments of the present disclosure.

FIG. 12B depicts a block diagram of an example computing system 50 that performs visual search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to gen-erate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 90 may be stored on-device and/or may be stored on a server computing system. In some implementations, the one or more generative models 90 can perform on-device processing to determine suggested searches, suggested actions, and/or suggested prompts. The one or more generative models 90 may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining input data descriptive of a request to open an overlay visual search interface;
in response to the input data, generating, with the overlay visual search interface implemented at an operating system level, display data descriptive of content currently being provided for display by a user computing device;
obtaining, with the overlay visual search interface, a gesture that selects a region of the display data;
in response to obtaining the gesture, processing, on the user computing device, the display data and data descriptive of the gesture with an on-device segmentation model to generate an image segment that comprises an object within the region selected by the gesture;
transmitting the image segment comprising the object to a server computing system;
in response to transmitting the image segment, receiving additional information comprising a plurality of web resources determined to be associated with the object;
processing at least a subset of the plurality of web resources with a generative model to generate a model-generated response; and
providing the model-generated response for display within a search results interface of the overlay visual search interface.

2. The system of claim 1, wherein processing, on the user computing device, the display data and the data descriptive of the gesture with the on-device segmentation model to generate the image segment that comprises the object within the region selected by the gesture comprises:
determining, with the overlay visual search interface, a region-of-interest within the display data based on the gesture and image features of the content currently being provided for display.

3. The system of claim 2, wherein processing, on the user computing device, the display data and the data descriptive of the gesture with the on-device segmentation model to generate the image segment that comprises the object within the region selected by the gesture further comprises:

processing, with the overlay visual search interface, the display data with an on-device segmentation model to generate a segmentation mask based on a detected object within the region-of-interest within the display data and to segment a portion of the display data based on the segmentation mask.

4. The system of claim 1, wherein the operations further comprise:

processing the display data with one or more on-device machine-learned models to generate one or more machine-learned model outputs; and generating one or more selectable user interface elements based on the one or more machine-learned model outputs.

5. The system of claim 4, wherein the one or more selectable user interface elements are descriptive of at least one of a detected object annotation, a preliminary classification, a suggested query, or a suggested action.

6. The system of claim 4, wherein the operations further comprise:

obtaining a user input that selects a particular selectable user interface element of the one or more selectable user interface elements; and transmitting a respective machine-learned model output associated with the particular selectable user interface element to the server computing system.

7. The system of claim 6, wherein the additional information is received in part based on the respective machine-learned model output.

8. The system of claim 1, wherein generating, with the overlay visual search interface implemented at the operating system level, the display data descriptive of content currently being provided for display by the user computing device comprises:

generating a data packet associated with the content currently being provided for display.

9. The system of claim 1, wherein obtaining, with the overlay visual search interface, the gesture that selects the region of the display data comprises:

obtaining, with the overlay visual search interface, a circling gesture that selects a particular object depicted in the content currently being provided for display.

10. The system of claim 1, wherein generating, with the overlay visual search interface implemented at the operating system level, the display data descriptive of content currently being provided for display by the user computing device comprises:

invoking, with an operating system of the user computing device, an overlay visual search interface based on the user input;

obtaining, with the overlay visual search interface, the display data descriptive of content currently being provided for display the user computing device within a first application.

11. A computer-implemented method, the method comprising:

obtaining, by a computing system comprising one or more processors, input data descriptive of a request to open an overlay visual search interface;

in response to the input data, generating, by the computing system and with the overlay visual search interface implemented at an operating system level, display data descriptive of content currently being provided for display by a user computing device;

obtaining, by the computing system and with the overlay visual search interface, a gesture that selects a region of the display data;

in response to obtaining the gesture, processing, by the computing system and on the user computing device, the display data and data descriptive of the gesture with an on-device segmentation model to generate an image segment that comprises an object within the region selected by the gesture;

transmitting, by the computing system, the image segment comprising the object to a server computing system;

in response to transmitting the image segment, receiving, by the computing system, additional information comprising a plurality of web resources determined to be associated with the object;

processing, by the computing system, at least a subset of the plurality of web resources with a generative model to generate a model-generated response; and providing, by the computing system, the model-generated response for display within a search results interface of the overlay visual search interface.

12. The method of claim 11, further comprising:

providing a filter over the content currently being provided for display based on obtaining the input data and invoking the overlay visual search interface.

13. The method of claim 12, wherein the filter tints the content currently being provided for display.

14. The method of claim 11, wherein transmitting, by the computing system, the image segment comprising the object to the server computing system comprises:

processing the image segment with an on-device embedding model to generate an image embedding; and transmitting the image embedding to the server computing system.

15. The method of claim 11, wherein the overlay visual search interface is configured to be provided regardless of applications or data provided for display.

16. The method of claim 11, wherein the input data is descriptive of a diagonal pull gesture; and wherein the overlay visual search interface is invoked based on the diagonal pull gesture.

17. One or more non-transitory computer-readable media that collectively store instructions that, when executed by one or more computing devices, cause the one or more computing devices to perform operations, the operations comprising:

obtaining input data descriptive of a request to open an overlay visual search interface;

in response to the input data, generating, with the overlay visual search interface implemented at an operating system level, display data descriptive of content currently being provided for display by a user computing device;

obtaining, with the overlay visual search interface, a gesture that selects a region of the display data;

in response to obtaining the gesture, processing, on the user computing device, the display data and data descriptive of the gesture with an on-device segmentation model to generate an image segment that comprises an object within the region selected by the gesture;

transmitting the image segment comprising the object to a server computing system;

in response to transmitting the image segment, receiving additional information comprising a plurality of web resources determined to be associated with the object;

processing at least a subset of the plurality of web resources with a generative model to generate a model-generated response; and providing the model-generated response for display within a search results interface of the overlay visual search interface.

18. The one or more non-transitory computer-readable media of claim 17, wherein the operations further comprise:

determining, with a machine-learned suggestion model and based on the additional information, a follow-up query suggestion and a suggested action comprising a create-a-text suggestion;

determining, with the machine-learned suggestion model, a second application is associated with the suggested action; and providing, within a suggestion panel, a follow-up query suggestion and an application suggestion comprising an indication of the second application, wherein the second application comprises a messaging application.

19. The one or more non-transitory computer-readable media of claim 18, wherein the operations further comprise:

in response to receiving a selection of the application suggestion, processing the visual search data with the generative model to generate a model-generated output.

20. The one or more non-transitory computer-readable media of claim 19, wherein the operations further comprise:

transmitting, via the overlay visual search interface, the model-generated output to the messaging application.

\* \* \* \* \*